(12) United States Patent
Calhoun et al.

(10) Patent No.: US 11,390,545 B2
(45) Date of Patent: Jul. 19, 2022

(54) ZERO DISCHARGE WATER TREATMENT APPARATUS AND METHOD

(71) Applicant: Zero Discharge, LLC, Newton Center, MA (US)

(72) Inventors: David D. Calhoun, Duxbury, MA (US); Mark D. Lorusso, Portsmouth, NH (US); R. Edward Rose, Jr., Hingham, MA (US)

(73) Assignee: ZERO DISCHARGE, LLC, Newton Center, MA (US)

( * ) Notice: Subject to any disclaimer, the term of this patent is extended or adjusted under 35 U.S.C. 154(b) by 0 days.

(21) Appl. No.: 16/862,121

(22) Filed: Apr. 29, 2020

(65) Prior Publication Data

US 2020/0339454 A1 Oct. 29, 2020

Related U.S. Application Data

(60) Provisional application No. 62/839,901, filed on Apr. 29, 2019.

(51) Int. Cl.
*C02F 3/12* (2006.01)
*C02F 1/44* (2006.01)
(Continued)

(52) U.S. Cl.
CPC ............ *C02F 3/1268* (2013.01); *C02F 1/001* (2013.01); *C02F 1/048* (2013.01); *C02F 1/447* (2013.01);
(Continued)

(58) Field of Classification Search
CPC .......... C02F 3/1268; C02F 1/001; C02F 9/00; C02F 1/447; C02F 1/72; C02F 1/048;
(Continued)

(56) References Cited

U.S. PATENT DOCUMENTS 3,338,663 A * 8/1967 Beecher .................... A61L 2/07
422/295
3,454,353 A * 7/1969 Bjork ........................ A61L 2/24
422/116
(Continued)

FOREIGN PATENT DOCUMENTS

CN 206544960 A 10/2017
CN 206544960 U 10/2017
(Continued)

OTHER PUBLICATIONS

Interstate Technology Regulatory Council, "PFAS-Per and Polyfluoralkyl Substances—12 Treatment technologies", SERDP Related Research, pp. 1-59 (2018).

(Continued)

*Primary Examiner* — Joseph W Drodge
(74) *Attorney, Agent, or Firm* — Lorusso & Associates

(57) ABSTRACT

A wastewater management system includes a series of holding tanks in combination with a membrane bioreactor treatment subsystem connected to one or more autoclaves and/or sonolysis units and thermal evaporators to treat liquid discharge from the system. A condenser connected to the thermal evaporator(s) condenses water vapor created by the thermal evaporator(s) into its liquid state for delivery to, and assimilation by, plants in a dedicated greenhouse or hydroponic system or for reuse in a building. $CO_2$ and water vapor produced by combustion of a thermal evaporator fuel source is sent through the condenser to add to the liquid water recovery. The $CO_2$ is flowed into the greenhouse(s) for carbon fixation by plants. A $CO_2$ monitoring system ensures the concentration of $CO_2$ in the greenhouse is maintained at an acceptable level for humans. Ozonation, UV and/or chloride treatments may be used as optional water purification treatments in the system.

20 Claims, 17 Drawing Sheets

(51) Int. Cl.
C02F 1/04 (2006.01)
C02F 1/72 (2006.01)
C02F 9/00 (2006.01)
C02F 1/00 (2006.01)

(52) U.S. Cl.
CPC .................. C02F 1/72 (2013.01); C02F 9/00 (2013.01); C02F 2301/08 (2013.01)

(58) Field of Classification Search
CPC ........ C02F 2301/08; C02F 1/16; C02F 1/302; C02F 2001/007; C02F 2303/24; C02F 1/36; C02F 1/76; C02F 1/78; C02F 1/32; C02F 1/042; C02F 3/006; C02F 3/1273; C02F 1/008; C02F 1/02; C02F 1/025; C02F 1/04; C02F 1/44; C02F 1/441; C02F 1/442; C02F 1/444; C02F 2201/002; C02F 2201/005; C02F 2201/007; C02F 2209/001; C02F 2209/08; Y02W 10/10; Y02W 10/37; B01D 5/006; B01D 1/0011; B01D 1/0041; B01D 1/0047; B01D 1/0052; B01D 1/0082; B01D 1/0094; B01D 1/14; B01D 1/30; B01D 5/0057; B01D 36/00; B01D 36/04

See application file for complete search history.

(56) References Cited

U.S. PATENT DOCUMENTS

| | | | |
|---|---|---|---|
| 3,907,679 | A | 9/1975 | Yost |
| 3,930,960 | A | 1/1976 | Taylor |
| 4,092,242 | A | 5/1978 | Deane |
| 5,543,039 | A | 8/1996 | Odegaard |
| 5,787,537 | A | 8/1998 | Mannillo |
| 5,792,313 | A | 8/1998 | Johansson |
| 6,024,876 | A | 2/2000 | Pannier |
| 6,379,527 | B1 | 4/2002 | Vogt |
| 6,517,711 | B1 | 2/2003 | Rummler |
| 7,628,893 | B1 | 8/2009 | Bosner et al. |
| 7,661,662 | B2 | 2/2010 | Forstmanis |
| 7,968,057 | B2 | 6/2011 | Burrows |
| 9,593,025 | B2 | 3/2017 | Clark et al. |
| 2004/0084366 | A1 | 5/2004 | Anderson |
| 2006/0057021 | A1 | 3/2006 | Sawyer et al. |
| 2006/0059922 | A1 | 3/2006 | Anderson et al. |
| 2006/0096918 | A1* | 5/2006 | Semmens ............ B01D 63/026 210/615 |
| 2006/0163155 | A1* | 7/2006 | Chauzy ................ C02F 3/1221 210/605 |
| 2007/0131533 | A1 | 6/2007 | Blum |
| 2007/0163958 | A1* | 7/2007 | Newcombe .............. C02F 1/44 210/650 |
| 2007/0209999 | A1* | 9/2007 | Smith .................... C02F 11/08 210/631 |
| 2009/0230059 | A1 | 9/2009 | McGuire et al. |
| 2011/0017678 | A1 | 1/2011 | Anderson et al. |
| 2011/0315629 | A1* | 12/2011 | Drogui ................. B01D 61/145 210/616 |
| 2012/0067796 | A1 | 3/2012 | Lo et al. |
| 2012/0097590 | A1* | 4/2012 | Early .................... C02F 3/1247 210/198.1 |
| 2012/0181229 | A1* | 7/2012 | Shinohara ............. B01D 61/04 210/603 |
| 2014/0048466 | A1* | 2/2014 | McGuire .................. C02F 1/78 210/170.09 |
| 2015/0164108 | A1* | 6/2015 | Logan ..................... A23J 1/001 530/350 |
| 2015/0275166 | A1 | 10/2015 | Prior |
| 2016/0326015 | A1 | 11/2016 | Neu et al. |
| 2016/0368803 | A1* | 12/2016 | Pyrhonen ............ B01D 61/022 |
| 2018/0009688 | A1 | 1/2018 | Ertel |

FOREIGN PATENT DOCUMENTS

| | | |
|---|---|---|
| CN | 207775025 U | 8/2018 |
| WO | 2010/000798 A1 | 1/2010 |
| WO | 201000798 A1 | 1/2010 |

OTHER PUBLICATIONS

Kate Whiting, "These Dutch Tomatoes can Teach the World About Sustainable Agriculture", World Economic Forum, Nov. 27, 2019, pp. 1-4.

Stephen P. Mezyk, Kimberly A. Rickman, Charlotte M. Hirsch, Michelle K. Dail, Jeremy Scheeler, Trent Foust, "Advanced Oxidation and Reduction Process Radical Generation in the Laboratory and an a large Scale: An Overview", Department of Chemistry & Biochemistry, California State University, Corresponding Author, Chapter 9, Elsevier (2013) pp. 227-248.

Author Unknown, Ovivo microBLOX 4 ZONE brochure, Ovivo USA, LLC, 2010.

Author Unknown, Thermal Evaporator brochure, ENCON Evaporators, 2015.

Ateeya Vawda, Al Khaleej, "The Implementation of a Steam transformer System" https://www.semantic scholar.org/paper/The-Implementation-of-a-Steam-Transformer-System, 2002.

Ravi Prasher, Dr. Peter McGrail, "High Efficiency Adsorption Chillers—High Efficiency Adsorption Cooling Using Metal Organic Heat Carriers", Advanced Research Projects Agency-Energy, Pacific Northwest National Laboratory, Oct. 1, 2010-Sep. 30, 2013.

Dr. Dennis Lye, USEPA, "Rooftop Runoff as a Source of Contamination: A Review", Rainwater Resources Articles, 2019, pp. 1-11. https://www.pwdplanreview.org/manual/Chapter-4/4.3-green-roofs "Stormwater Management Practices", pp. 1-21.

National Academies of Sciences, Engineering, and Medicine 2016, "Using Graywater and Stormwater to Enhance local Water Supplies: An Assessment of Risks, Costs, and Benefits", https://doi.org/10.17226/21866 pp. 93-120.

FDA Statement, Norman E. Sharpless, Md, Frank Yiannas, "Statement on FDA's Scientific Work to Understand PER- and Polyfluoroalkyl substances (PFAS) in Food, and Findings From Recent FDA Surveys", Jun. 11, 2019, pp. 1-5.

U.S. Department of Health and Human Services, Food and Drug Administration, "Guidance for Industry: Possible Pioxin/PCB Contamination of Drug and Biological Products", Aug. 1999, Compliance pp. 1-5.

Ahmed A. Al-Ghamdi, "Recycling of Reverse Osmosis (RO) Reject Streams in Brackish Water Desalination plants using Fixed bed Column Softener", ScienceDirect: www.sciencedirect.com Sep. 7-11, 2016, Spain pp. 205-211.

Aquapoint, "Meeting House Wastewater Treatment Plant: Ground Water Protection Community Removes Total Nitrogen", https://www.aquapoint.com Oct. 6, 2016 pp. 1-6.

Steven Walker, Paul Mattausch, and Alicia Abbott, Reverse Osmosis Treatment Facilities: Innovative Post-Treatment Stabilization Solutions, Florida Water Resources Journal, Nov. 2007, pp. 35-37. www.aesarabia.com/limestone-contactor, "Limestone Contactor", Oct. 31, 2019 pp. 1-4.

Mar Perez-Fortes, Jan C. Scheneberger, Aikaterini Boulamanti, Evangelos Tzimas, "Methanol Synthesis using Captured CO2 as Raw material: Techno-economic and Environmental Assessment" Applied Energy, vol. 161, Jan. 2016 pp. 718-732.

Aruna Singh, Yash Sharma, Yasaswy Wupardrasta, Karan Desai, "Selection of Amine Combination for CO2 Capture in a Packed Bed Scrubber", ScienceDirect, Research Paper, Dec. 21, 2016 pp. S165-S170.

Rebecca Dalzell, "The Gilded Age origins of New York City's Rooftop Gardens", https://www.ny.curbed.com, Jul. 16, 2014.

Oscar Stevens, How often do You Change Water for Hydroponics? https://the hydroponicsplanet.com, Dec. 19, 2018 multiple articles.

Bert Markgraf, Sciencing Journal, "How to Set up Grey Water Recycling" Apr. 25, 2017, pp. 1-4.

John Peterson, Sciencing "How to Recycle Air Conditioning Water Condensation", Apr. 25, 2017 pp. 1-3.

(56) References Cited

OTHER PUBLICATIONS https://www.sustainability.stackexchange.com, "Which Tree Consumes Most Carbon Dioxide and Poisonous Gases", Jan. 4, 2019 pp. 1-15.
Kourossh Mousavi Takami, Jafar Mahmoudi, Rune H. Time, "A Simulated H2O/CO2 Condenser Design for Oxy-fuel CO2 Capture Process", ScienceDirect Energy procedia1 (2009) pp. 1443-1450.
Karia Lant, Futurism Journal, "A Plant 1,000 Times More Efficient at CO2 Removal Than Photosynthesis is Now Active", Jun. 1, 2017, pp. 1-9.
Jamie McIntosh, "Grow Flowers With Hydroponics" the Spruce.com, Jan. 1, 2019, pp. 1-9.
Yasir A.J. Al-Hamadani, Chanil Jung, Jong-Kwon Im, Linkel K. Boateng, Joseph R.V.Flora, Min Jan, Jiyong Heo, Chang Min Park, Yeomin Yoon, "Sonocatalytic Degradation Coupled with Single-walled Carbon Nano-Tubes for Removal of Ibufrofen and Sulfamethoxazole" Chemical Engineering Science, vol. 162, Apr. 27, 2017, pp. 300-308.
1.) Emir Baki Denkbas, Cem Batram, ScienceDirect: Sonolysis "Nanobiomaterials in Drug Material" 9.2.1.8 Sonolysis, date unavailable. 2.) Takashi Kondo, ScienceDirect, "Sonochemistry and the Acoustic Bubble" 9.1.6, 2015. 3.)Takahide Kimura, ScienceDirect, "Sonochemistry in Homogeneous Systems", 7.2, 2015. 4.) M. Marciello, M.P. Morales, 3.2.9 "Sonochemical Decomposition", 2016.
Angela Godwin, "Understanding PFAS", Water World, Jan. 2020, pp. 22-33.
Frank Massa, "3i, Radiation of Sound", The American Institute of Physics handbook, 3rd Edition, 1972, entire document.
Kandasamy Thankavadivel, Mallavarpu Megharaj, Ackmez Mudhoo, Ravi Naidu, 18 "Degradation of Organic Pollutants Using Ultrasound", Taylor & Francis Group, LLC, 2012, entire document.
Ian Ross, Jeffrey McDonough, Jonathan Miles, Peter Storch, Parvathy Thelakkat Kochunarayanan, Erica Kalve, Jake Hurst, Soumitri S. Dasgupta, Jeff Burdick, "A Review of Emerging Technologies For remediation of PFASs" Research Article: Wiley Periodicals, Inc., 2018, 28: 101-126.
Lucia Rodriguez-Freire, Rajesh Balachandran, Reyes Sierra-Alavarez, Manish Keswani, "Effect of Sound Frequency and Initial Concentration on the Sonochemical Degradation of Perfluorooctane Sulfonaate (PFOS)" ScienceDirect, Journal of hazardous Materials, vol. 300, Dec. 30, 2015, pp. 662-669.
Chin-Pao Huang M. Asce, and Samuel Paul Myoda, "Sonochemical treatment of Wastewater Effluent for the Removal of Pathogenic Protozoa Exemplified by Cryptosporidium", Practice Periodical of hazardous, Toxic and Radioactive Waste Management, Apr. 2007, pp. 114-122.
Ian Ross, Erika Houtz, Jeff McDonough, Peter Storch, "Full-Scale treatment of PFAS-Impacted Wastewater Using Ozofractionation with Treatment Validation Using Top Assay", Arcadis and Evocra, 2017, entire document.
Robert Mueller, Virginia Yingling, "Remediation Technologies and Methods for Per- and Polyfluoroalkyl Substances (PFAS)" Interstate Technology Regulatory Council (ITRC), Mar. 2018 pp. 1-12.
Sandra Lundgren, "Evaluation of the Efficiency of Treatment Techniques in Removing Perfluoroalkyl Substance From Water", Uppsula University Department of Aquatic Sciences and Assessment, Swedish University of Agricultural Sciences, Sep. 2014 pp. 1-56.
Holger Lutz, Stefan Panglisch, Axel Bergmann, and Torsten E. Schmidt, "Treatment Options for the Removal and Degradation of Polyfluorinated Chemicals", Springer-Verlag Berlin Heidelberg (2012) pp. 103-125.
Michael Adam, "Per- and Perfluoalkyl Substances (PFASs) Remediation Technologies", U.S. EPA Contaminated Site Cleanup Information (CLU-IN), Dec. 10, 2019 pp. 1-19.
Jie Cheng, Chad D. Vecitis, Hyunwoc Hoffmann, "Sonochemical Degradation of Per—Perfluorooctanoate (PFOA) in Groundwater: Kinetic Effects of Matrix Inorganics" Environ. Sci Technol 2010, 44,1, 445-450.

Ian Ross, Ph.D. "The Emerging Issue: PFAS, Big Picture: Challenges and Solutions", Arcadis Design & Consultancy, Aug. 2016 pp. 1-29.
Lan-Anh Phan Thi, Huu-Tuan Do, Shang-Lien Lo, "Enhancing Decomposition Rate of Perfluorooctanoic Acid by Carbonate Radical Assisted Sonochemical Treatment", Ultrasonics Sonochemistry, vol. 21, Issue 5, Sep. 2014, pp. 1875-1880.
Boon Mian Teo, Franz Grieser, and Muthupandian Ashokkumar, "19. Applications of Ultrasound to Polymer Synthesis", Taylor & Francis Group, LLC, 2012 pp. 464-475.
Holohan, Vacuum Pumps Solve a Lot of Steam Distribution Problems, Supply House Times, May 18, 2017 pp. 1-4.
Nes Company, "What is the Purpose of a Steam Vacuum Pump?" https://www.nescompany.com pp. 1-6 , Sep. 3, 2020.
Kenneth K.K. Lam, "Ozone Disinfection of SARS-Contaminated Areas", Article 2019?
Laura Haupert, "Odor Control in Wastewater", Water World, Jun. 2020, pp. 16-18.
Amit Gupta, An Introduction to Steam Sterilization-Autoclave Work, Consolidated Sterilizer Systems, date unavailable, pp. 1-20.
Chris Boyd, "Legionella Risk Management", Commercial Water magazine, Jan. 2020, pp. 1-4.
Salahuddin Qazi, "Standalone Photovoltaic (PV) Systems for Disaster Relief and Remote Areas", Elsevier, the Netherlands, 2017, pp. 1-279.
United Nations General Assembly, "Resolution Adopted by the General Assembly—64/292. The Human Right to Water and Sanitation", Sixty-Fourth Session, Agenda Item 48, Aug. 3, 2010, pp. 1-3.
K.C. Toussaint, Jr. ', P.M. Ferreira, L.J. Guo, T. Wendelin, G. Zhu, M. Gray, "Development of Planar Focusing Collector for CSP", SunShot, U.S. Department of Energy, CSP Summit, 2016, pp. 1-10.
Tania Ritchie, "Concentrated Solar Thermal Energy", CSIRO Research & Applications, Newcastle, Jun. 2011, pp. 1-26.
Reza Daneshazarian, Erdem Cuce, Pinar Mert Cuce, Farooq Sher, "Concentrating Photovoltaic Thermal (CPVT) Collectors and Systems: Theory, Performance Assessment and Applications" Elsevier, Renewable and Sustainable Energy Reviews, 2019, pp. 1-19.
Google Search, "Boiler and Pressure Vessel Certification" The National Board and ASME Guide Certification of a Manufacturer's or Assembler's Quality Control System in Accordance with ASME Boiler and Pressure Vessel Code (BPVC), date unavailble, Sections I, IV, VIII,X and/or XII.
V. Ryan, Parabolic Solar Collectors, https://technologystudent.com/energy1/solar3.htm; date unavailable, pp. 1-3.
https://www.parabolicsolartrough.com; "Thermal Water Heater", date unavailable, pp. 1-7. https://www.sciencedirect.com/topics/engineering/parabolic-trough, date unavailable, Power Generation Technologies, entire document.
https://www.parabolicsolartrough.com; NNikolay Belyakov "Sustainable Power Generation", 2019, Section 17.2.2.1 "Parabolic Trough". a.) M.U.H. Joardder ..M.H. Masud "Clean Energy for Sustainable Development", 2017, Section 8.6.1.1 "Parabolic Trough Solar Collector". b.) C.S.Turchi . . . P.C. Bueno "Foundamentals and Applications of Supercritical Carbon Dioxide (sCO2) Based Power Cycles", 2017, Section 11.2.1. c.) Andreas Haberledirk Kruger "Concentrating Solar Power Technology" ($2^{nd}$ edition), 2021, Section 18.3.1.1.
V.K. Jebasingh, J. Divya Johns, & T. Arunkumar, "Assessment of Circular and Elliptical Absorber Tube in Solar Parabolic Trough Collector", 2019, International Journal of Ambient Energy, DOI: 10.1080/01430750.1670732, Entire document.
Tarun Anumol "How do you Solve a Problem Like PFAS?", May 15, 2020, Water World, pp. 1-17.
EPA, "Improved Methods to Manage PFASs for Small Water and Wastewater Treatment Systems in Rural Areas", Grant No. R840080, $1,599,954, Oct. 1, 2020 thru Aug. 31, 2023—to develop improved, cost-effective treatmenl trains . . . pp. 1-2, University of Georgia.
EPA, "Electron Beam Technology for Destruction of Short-Chain & Perfluoroalkyl Substances in Groundwater, Wastewater, Sewage Sludges, and Soils", Grant No. RD839650, $899,164, Texas A&M Agricultural Research and Extension Center, pp. 1-3.

(56) References Cited

OTHER PUBLICATIONS

EPA, "The BOHP/UV Process for Destruction of PFAS in Leachate and Groudwater: Tandem Mechanistic advancement and pilot demonstralion". Grant No. RD839630, $458,469, Aug. 1, 2019 through Jul. 31, 2022, Clemson Jniversity, pp. 1-3.

EPA, "Decreasing Polyfluoroalkyl Substances (PFASs) in Municipal Wastewater Effluent and Minimizing Release from and-applied Biosolids", Grant No. RD839640, $899,960, Aug. 1, 2019 through Jul. 31, 2022, Purdue University, University of Illinois-Chicago, University of Florida, pp. 1-3.

Feng Xiao, Pavankumar Challa Sasi, Bin Yao, Alena Kubatova, Svetiana A. Golovko, Mikhail Golovko, and Dana Soli, "Thermal Stability and Decomposition of Perfluoroalkyl Substances on Spent Granular Activated Carbon" Environ. Sci. Technol Lett. 2020, 7,5, 343-350 Apr. 20, 2020.

Junkui Cui, Panpan Gao, Yang Deng, "Destruction of Per- and Polyfluoroalkyl Substances (PFAS) with Advanced Reduction Processes (ARPs): A Critical Review", Envir. Sci. Technol. 2020, 54,7,3752-3766 Published Mar. 12, 2020.

Jelena Radjenovic*, Nick Duinslaeger, Shirin Saffar Avval, and Brian P. Chaplin," Facing tthe Challenge of Poly- and Perfluoroalkyl Substances in Water: Is Electrochemical Oxidation the Answer?", Envir. Sci. Technol. 2020, 43, 23, 14815-14829 Published Nov. 15, 2020.

Water World, Feb. 8, 2021 "Project uses Nutrients Recovered from Wastewater to Aid Farmers", Norway, pp. 1-12.

Invenno Engineering, LLC "Best Practice No. 44 _ Steam "Thermocompressor Systems pp. 1-7Dec. 4, 2017.

Norm Hall, R.L. Deppmann" Medium & High Pressure Steam Vented Flash Tank Trim", May 15, 2017, pp. 1-6.

B. A. Lasibekan, A.R. Akisanya and W.F. Deans, "Autoclave Design For High Pressure-High Temperature Corrosion Studies", School of Engineering, University of Aberdeen, Aberdeen AB24 3UE, UK pp. 1-32.

A. Fraiese, V. Naddeo, C.S. Uygener-Demirel, M. Prado, A. Cesaro, T. Zarra, H. Liu, V. Belgiorno, and F. Ballesteros, Jr. "Removing of Emerging Contaminants in Wastewater by Sonolysis, Photocatalysis and Ozonation" Global Nest Journal, vol. 21 No. 2, pp. 98-105 Mar. 12, 2018.

Nashwa A.H. Fetyan, Tamer Mohamed Salem Attia, "Water Purification Using Ultrasound Waves: application and challenges", Arab Journal of basic and Applied Sciences vol. 27, 2020—Issue 1.

Lisa Zyga, " Nanisilicon rapidly splits water without light, heat or electricity", Phys.Org Jan. 24, 2013.

Industrial and Engineering Chemistry, "Scale-up of Sonochemical reactors for Water Treatment", Research, 2001, 40, 3855-3860, Chapter 3, pp. 37-78.

Kandasamy Thangavadivel, Mallavarapu Megharaj, Ackmez Mudhoo, and Ravi Naidu "Degradation of Organic Pollutants Using Ultrasound" Chapter 18 pp. 447-373 2012 by Taylor & Francis Group, LLC.

Mitch Olson, Ph.D., P.E., Andrew Pawlisz, D.A.B.T., "PFAS Redemdiation Technologies: Breaking the Carbon-Fluorine Bond" Trihydro, Oct. 15, 2019, pp. 1-6.

Committee on the beneficial use of Graywater and Stormwater, "Using Graywater and Stormwater to Enhance local Water Supplies: An Assessment of Risks, Costs, and Benefits (2016)" National Academy of Sciences, Engineering, and Medicine 2016 https://doi.org/10.17226/21866 pp. 1-211.

Jeff Fitlow, Rice University "Researchers Report major Advance in Using Sunlight to Produce Stearn Without Boiling Water", Phys. Org. Nov. 19, 2012 pp. 1-4.

Gary Battenberg, Water Conditioning & Purification, Nov. 2019 Issue, "Groundwater Depletion and Decline Caused by Sustained Pumping" pp. 26-28.

Andrea Leeson, Ph.D., Strategic Enviromental Research and Development Program (SERDP), "Improved Understanding of Thermal Destruction Technologies For materials with PER—and Polyfluoroalkyl Substances" Son No. ERSON-21-C1. Oct. 24, 2019, pp. 1-20.

Jade Boyd, Rice University, Phys.Org, "Engineers Boost Power Output of Solar Desalination System by 50%", Jun. 18, 2019 Issue, pp. 1-5.

Osama Ayadiyousef Ahmad Al-Tork, Research Gate-Conference Paper Oct. 2015, "Optimize and Validate the Performance of a Solar Air Conditioning System under Jordan Climate" pp. 1-8.

Santosh R. Ghimire, John M. Johnston,Wesley W. Ingwersen, and Troy R. Hawkins, "Life Cycle Assessment of Domestic and Agricultural Rainwater harvesting Systems" Environmental Science & Technology, 2014, 48, 4069-4077.

Chidozie Charles Nnaaji, "Sustainable Water Supply in Buildings Through Rooftop Rainwater Harvesting", Springer Nature Switzerland AG 2020, CIDB 2019 pp. 1-390-400.

Md. Faruque Hossain, "Global Sustainability in Energy, Building, Infrastructure, Transportation and Water Technology" ISBN 978-3-030-62376-0 eBook pp. 1-469.

Zhanghao Chen, Chen Li, Juan Gao, Hailiang Dong, Yi Chen, Bing Wu, and Cheng Gu, Efficient Reductive Destruction of Perfluoroalkyl Substances under Self-Assembled Micelle Confinement Environ. Sci. Technol. 2020, 54, 5178-5185.

Hanna Hamid, Loretta Y. Li, John R. Grace, Envirinmental Pollution, vol. 235, Apr. 2018, pp. 74-84.

National Research Council (US) Safe Drinking Water Committee, NCBI Bookshelf, National Institute of Health, vol. 2 "The Disinfection of Drinking Water", 1980 pp. 1-86.

David Vergun, Defense.ORG, "Researchers at Science Workshop Discuss PFAS Cleanup Issue" Nov. 18, 2019 pp. 1-5.

Kerri Jansen, https://cen.acs.orgenvironment/persistent-pollutants, "Forever Chemicals' no more? These Technologies Aim to Destroy PFAS in Water", Mar. 25, 2019, vol. 97, Issue 12, pp. 1-10.

Donna L. Sutherland, Peter J. Ralph, "Microalgal Bioremediation of Emerging Contaminants-Opportunities and Challenges", Elsevier: Water Research, Jul. 27, 2019 pp. 1-11.

Boran Wu, Shilai Hao, Younjeong Choi, Christopher P. Higgins, Rula Deeb, and Timothy J. Strathmann, "Rapid Destruction and Defluorination of Perfluorooctanesuphonate by Alkaline Hydrothermal Reactions", Environ. Sci. Technol. Lett. 2019, 6,10, 630-636.

De Beers Group Company, "Treatment of Highly Contaminated Wastewater", Apr. 18, 2016 pp. 1-6.

Chris Woodward, https://explainthat stuff.com/autoclaves.html, "Autoclaves", Apr. 25, 2019 pp. 1-14.

https://en.wikipedia.org/wiki/Sterilization_(microbiology) "Cleaning Strategy/Sterilization/Autoclave/Glassware Washer" Apr. 2, 2020, pp. 1-16.

Anming Hu, Allen Apblett, Editors, "Nanotechnology for Water treatment and Purification" Lecture Notes in Nanosale Science & Technology, https://www.springer.com/series/7544 vol. 22 pp. 1-373.

American Chemical Society, Industrial and Engineering Chemistry, Research, 2001, 40, 3855-3860 "Scale-up of Sonochemical Reactors for Water Treatment" Chapter 3, pp. 37-78.

Jennifer Fitch, Marty Laporte, Julia Nussbaum, Adam Kern, and Spencer Barney, Environmental Quality and Water Efficiency Group, Stanford University, Dec. 2013 p. 1.

Ki Joo Pahk, Sunho Lee, Pierre Gelat, Matheus Oliveira de Andrade, Nader Saffari, www.Elsevier.com/locate/ultson, "The interaction of Shockwaves With a Vapour Bubble in Boiling Histotripsy: The Shock Scattering Effect" Aug. 18, 2020 pp. 1-12.

Kandasamy Thangavadivel, Mallavarapu Megharaj, Ackmez Mudhoo, and Ravi Naidu, "Degradation of Organic Pollutants Using Ultrasound" Chapter 18 Taylor & Francis Group, LLC pp. 447-475.

Magnus Karlsson, Hakan Carlsson, Mats Idebro, Christopher Eek, IEEE Journals & Magazine "Microwave Heating as a Method to Improve Sanitation of Sewage Sludge in Wastewater Plants", Sep. 27, 2019, pp. 142308-142316.

Ranran Wang, Julie B. Zimmerman, Yale University, "Economic and Environmental Assessment of Office building Rainwater Harvesting Systems in Various U.S. Cities", Environ. Sci. Technol. 2015, 49, 1768-1778 ACS Publications.

Kenneth K.K. Lamb, "Ozone Disinfection of SARS-Contaminated Areas", Enviro Labs Limited, 2003.

* cited by examiner

ZERO DISCHARGE WATER TREATMENT APPARATUS AND METHOD

CROSS-REFERENCE TO RELATED APPLICATIONS

This regular utility application claims the benefit of U.S. Provisional Application Ser. No. 62/839,901, filed Apr. 29, 2019, the contents of which are incorporated herein by reference.

FIELD OF THE DISCLOSURE

This disclosure relates to apparatus and methods to treat wastewater in large multi-unit housing buildings and large commercial buildings. More particularly, the disclosure relates to apparatus and methods to achieve zero wastewater discharge and reduce emission discharge from buildings having multiple bathrooms and water usage and disposal limitations. The disclosure also relates to apparatus and methods to treat contaminated wastewater and to reduce overall water usage for a particular building complex.

BACKGROUND OF THE DISCLOSURE

With ever increasing housing costs, particularly those associated with single family homes, more and more developments involve condominium and apartment complexes to provide more affordable housing. Such large-scale residential real estate developments place a significant burden on municipal services. In similar fashion, commercial developments such as office buildings and medical facilities also place a significant burden on municipal services, especially water and sewer services. With large buildings, whether residential or commercial, multiple bathrooms, kitchens, wash rooms and similar rooms have faucets, showers and toilets that drain waste water to a common wastewater pipe. In municipal settings, waste water flows into a common sewer line that brings sludge-laden waste water to treatment plants for processing and elimination.

The impact of new housing or commercial real estate developments on waste water treatment plants is becoming ever more significant as any such plant has capacity limits. Each new development brings each plant closer to capacity. For this reason, among many urban planning issues, limitations have to be placed on the number of building permits issued by a municipality. In some instances, building moratoriums have to be implemented to address infrastructure limitations.

With any new building development, multiple permits have to be secured in order to proceed with construction and development. State authorities, such as departments of environmental protection and local health departments, often have to approve a construction project plan before construction begins. One criterium often considered is the impact on groundwater and water sources by a construction project. This is less of a consideration if municipal sewer systems are used to receive effluent from a building development. If septic systems are needed, the issue is much more pronounced. Either way, wastewater produced by a housing or other building project adds either to the municipal burden or the environmental burden. What is needed is a means to eliminate the need for housing and commercial projects to be tied into municipal sewer systems. What also is needed is a means to eliminate the impact on groundwater and other water sources by wastewater produced by a housing and commercial developments. These and other objects of the disclosure will become apparent from a reading of the following summary and detailed description of the disclosure.

SUMMARY OF THE DISCLOSURE

The intent of this disclosure is to provide an apparatus and means to completely purify and reuse water brought into a building/facility in a cycle designed to minimize the wasting of water, to eliminate the unnecessary dumping of contaminated water back into an aquifer surrounding the building/facility and to thereby eliminate heretofore existing contaminants. The disclosure also provides for the use of alternate energy methods and sources to enhance the environmentally-conscious water treatment and water conservation processes and to alleviate and make as independent as possible, a building/facility from the infrastructure of a municipality. Other purposes of this disclosure include the elimination or reduction of carbon emissions created in water treatment processes, the prevention of nitrate/nitrite deposits into groundwater and the total destruction of all organic contaminants (including polyfluoroalkyl substances (PFASs)) and inorganic pathogens existent in original water supplies.

In one aspect of the disclosure, a wastewater treatment system incorporates a wastewater collection tank secured to waste lines running from fixtures such as sinks and toilets. The collection tank is connected to a membrane bioreactor treatment system. The primary function of the treatment system is to separate the solid and liquid components of waste water. Separated-out solids are taken offsite for final disposal. In an alternate embodiment, the solids are treated with microwave energy before offsite disposal.

The liquid component is exposed to a UV disinfection unit to neutralize potential pathogens and other microbial elements in the liquid component. Thereafter, the liquid is transferred to an effluent holding tank for further transmission to one or more evaporator units. The evaporator units permit the evaporation or distillation of the wastewater to separate any remaining particulate matter from the water component. The water component is evaporated and may be condensed for additional use as a source of water for reuse in the building including a water source for growing carbon-capturing plants in illustratively a greenhouse, a hydroponic greenhouse or a rooftop garden. The solids are systematically removed and transported to solids reclamation facilities.

The evaporator unit uses an energy source, such as electricity, natural gas, propane and diesel fuel, to heat the wastewater and cause separation of the solid and liquid components. A combustion capture system is included to capture and process emissions from the natural gas combustion process. The carbon capture system may include plants enclosed in a building with filtered exhaust ports. The carbon emissions are exposed to the plants that absorb and assimilate the $CO_2$ content of the emissions.

In a further aspect of the disclosure, the evaporator unit(s) can be either vacuum or atmospheric units. Vacuum units reduce the pressure in the unit which facilitates evaporation at a much lower temperature and lower the cost per gallon of wastewater evaporated. An atmospheric based evaporator system does not alter the pressure within the unit and requires larger amounts of energy than the vacuum-based units to evaporate water.

In yet another aspect of the disclosure, a sonolysis unit is used to break up harmful chemical compounds found in waste water. The sonolysis unit uses a plurality of sound emitting devices to create cavitation bubbles that significantly increase the temperature and pressure in the bubbles to break down chemical components. Use of a sonolysis unit eliminates harmful chemicals before the treated fluids are further processed by the evaporator unit(s).

In a still further aspect of the disclosure, a continuous-cycle autoclave is positioned between the UV unit and the evaporator unit(s) to apply high heat and pressure to break down and eliminate harmful chemical compounds in waste water. The autoclave uses steam created by the evaporator in a feed-back loop to increase the pressure and temperature in the autoclave. This leads to the destruction of the unwanted chemical compounds and releases treated water to the evaporator at an elevated temperature that reduces the energy requirements to further process the water introduced into the evaporator via pure evaporation and/or distillation. These and other aspects of the disclosure will become apparent from a review of the appended drawings and a reading of the following detailed description of the disclosure.

DETAILED DESCRIPTION OF THE DISCLOSURE

Figure 1A:
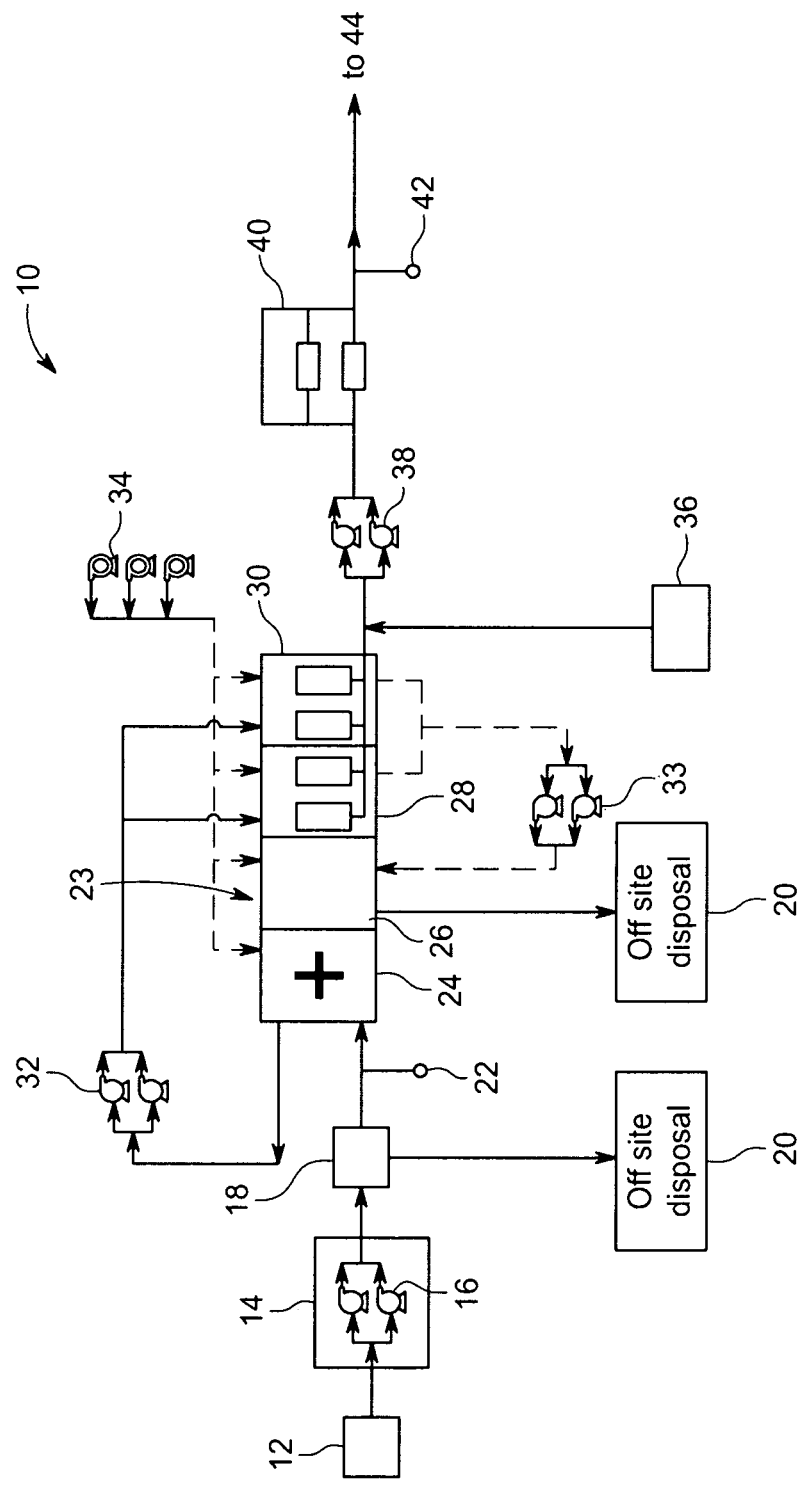
FIG. 1A is a flow chart of a first segment of a wastewater disposal system according to one embodiment of the disclosure.

Referring to FIG. 1A, in one aspect of the disclosure, a wastewater treatment system shown generally as 10 includes a series of components to separate and reduce raw sewage into disposable solids and reusable liquids brought to the system by a building plumbing system. The raw sewage is first deposited into one or more pretreatment tanks 12 that function as septic tanks to separate grease, grit and primary solids from the liquid component of the wastewater. The solids component is shipped offsite according to means used with conventional septic systems as is known in the art. The clarified liquid component is transferred via pipe system to one or more flow equalization tanks 14 that each include one or more influent pumps 16. Pumps 16 are used to force the clarified liquid through a fine screen 18 before further transfer in system 10. Fine screen 18 has a mesh selected for the particular solids being filtered out as is well known in the art.

Any particulate matter filtered out by screen 18 is shipped offsite with the solids component derived from pretreatment tank(s) 12. An optional influent composite sampling tap 22 may be placed in the piping system downstream of screen 18 to monitor the composition of the clarified and filtered liquid or influent before entry into other components of system 10 downstream of screen 18. It should be understood that "influent" as used in this context concerns fluids to be introduced into an evaporator component of system 10. This permits adjustment of the pretreatment tank(s) and filter screen to produce influent with the degree of clarity necessary to meet state, federal and local requirements. As is well known in the art, a finer mesh screen will retain smaller particles and result in clearer/cleaner water. Conversely, use of a coarser mesh screen will not retain smaller particles and result in cloudier/less clean water.

Once the clarified liquid has been screened, it is transferred next to a membrane bioreactor shown generally as 23. Bioreactor 23 is a multi-component subassembly with an anoxic zone 24, waste activated sludge holding and storage zone 26, a first membrane bioreactor basin 30 and a second membrane bioreactor basin 28. The four separate treatment zones each further reduce particulate matter in the influent to further clear the fluids.

The clarified liquid first enters anoxic zone 24 to remove any dissolved oxygen in the liquid. Once the liquid has been cycled through anoxic zone 24, it is transferred through bioreactor 23 via one or more transfer pumps 32 incorporated into bioreactor 23. The oxygen-depleted liquid or influent is moved by transfer pump(s) 32 from anoxic zone 24 to membrane basins 28 and 30. Membrane basins 28 and 30 each include one or more filter membrane units that further filter out particulate matter in the clarified liquid. One or more blowers 34 flow pressurized air into the membrane basins to create a positive pressure environment to increase the filter rate of the membrane basins. Blowers 34 also flow pressurized air into anoxic zone 24 and WAS holding zone 26 to also increase the pressure in the bioreactor segments to improve flow through bioreactor 23.

The filtrate or permeate component of the filtered liquid is drawn into a clean-in-place unit 36 by one or more inline permeate pumps 38. Pumps 38 urge the filtrate or permeate into one or more ultraviolet disinfection units 40. Once treated in the UV disinfection unit(s) 40, the treated liquid is transferred to an effluent storage tank 44 to await further processing. An effluent 24-hour composite sampling tap 42 is connected to the line between units 40 and storage tank 44 to permit round-the-clock sampling and evaluation of the treated liquid.

To further add to the water conservation benefits of the wastewater treatment system, water vapor condensed by air conditioning units in the building(s) serviced by the wastewater treatment system can be piped directly into the wastewater treatment system. The captured water can be transferred directly into the line feeding the UV disinfection unit(s) 40. The location of the transfer can be before or after the inline permeate pumps 38. Water condensed by air conditioners are commonly fed into a building's sewer line. By transferring AC condensed water to the wastewater treatment system 10, water that would otherwise be lost down a sewer line can be captured, purified and reused as disclosed herein.

With respect to the particulate or sludge component derived from the filtration of the clarified liquid, the component is pumped out of membrane basins 28 and 29 into a WAS holding zone 26 via waste-activated sludge pumps 33. The contents of the holding compartment 26 is removed from the compartment and taken offsite for disposal 20 along with the screened particulate matter previously described.

Figure 1B:
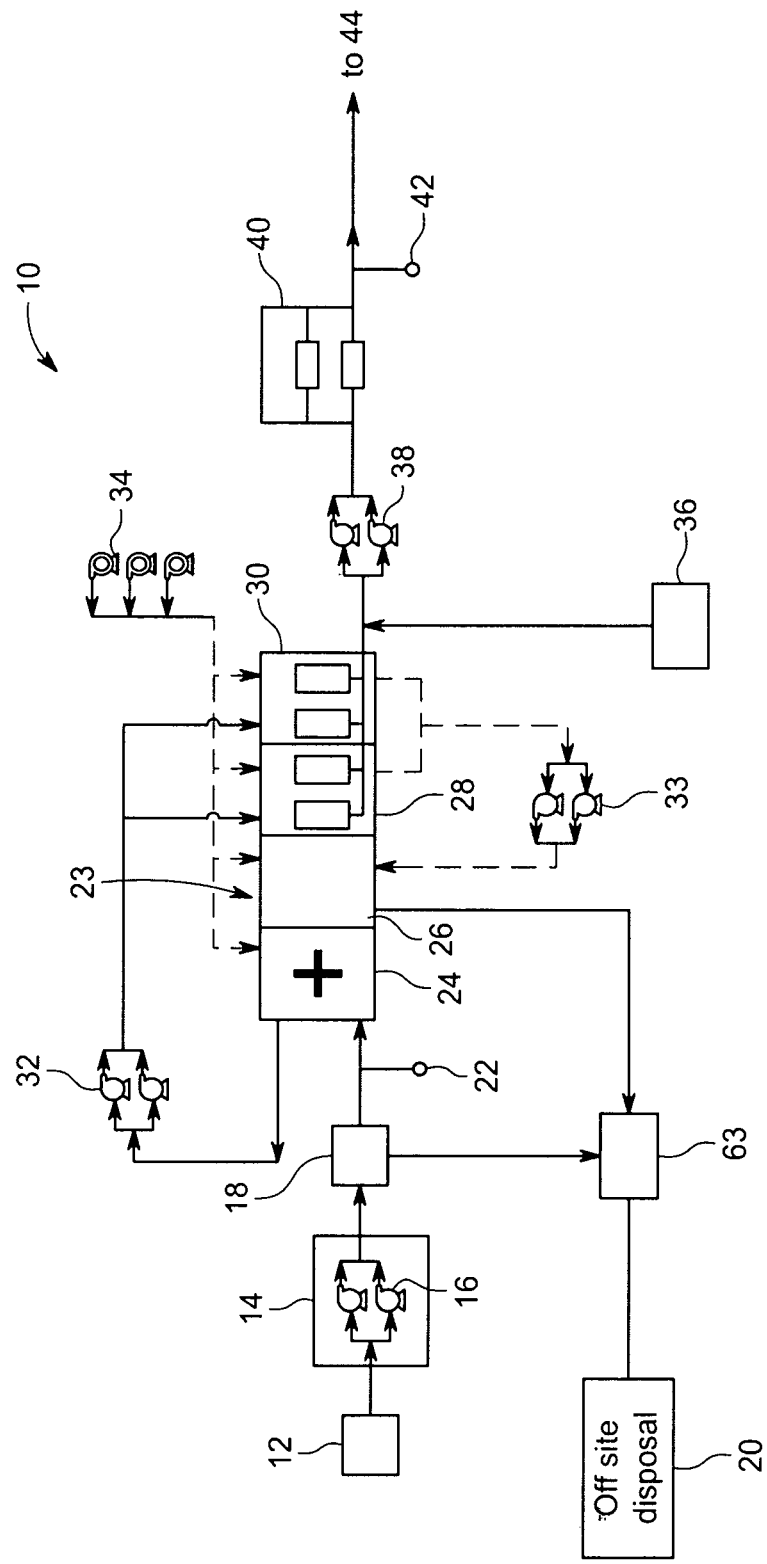
FIG. 1B is a flow chart of a first segment of a wastewater disposal system with a microwave unit according to another embodiment of the disclosure.

As an optional pre-treatment or pre-disposal step, the particulate or sludge component may be treated with an optional microwave unit to degrade and destroy at least some of the harmful biological and chemical materials and compounds resident in the sludge. As shown in FIG. 1B, a microwave unit 63 is positioned in-line with screen 18 and WAS holding zone 26. This ensures the sludge material shipped off-site is as inert as possible before final disposal.

Effluent pumps 46 positioned in effluent storage tank 44 pump the treated liquid stored in the tank onto one of two tracks. The first track is for reuse as toilet water if the treated liquid meets the requirements for classification as Class A reclaimed water. A dedicated pipe system (not shown) connects storage tank 44 to one or more toilets, laundry rooms, A/C units, etc. in a building, as allowed by federal, state and local regulations and ordinances, to provide the reclaimed water for use. A secondary line from the main water lines is also used in the event there is insufficient reclaimed water to meet usage rates. It is anticipated that 30% of the treated effluent may be used for this purpose. Otherwise, or in addition thereto, the treated effluent can be transferred to one or more thermal evaporators 48 for further processing via a second branching pipe line from storage tank 44.

Figure 2A:
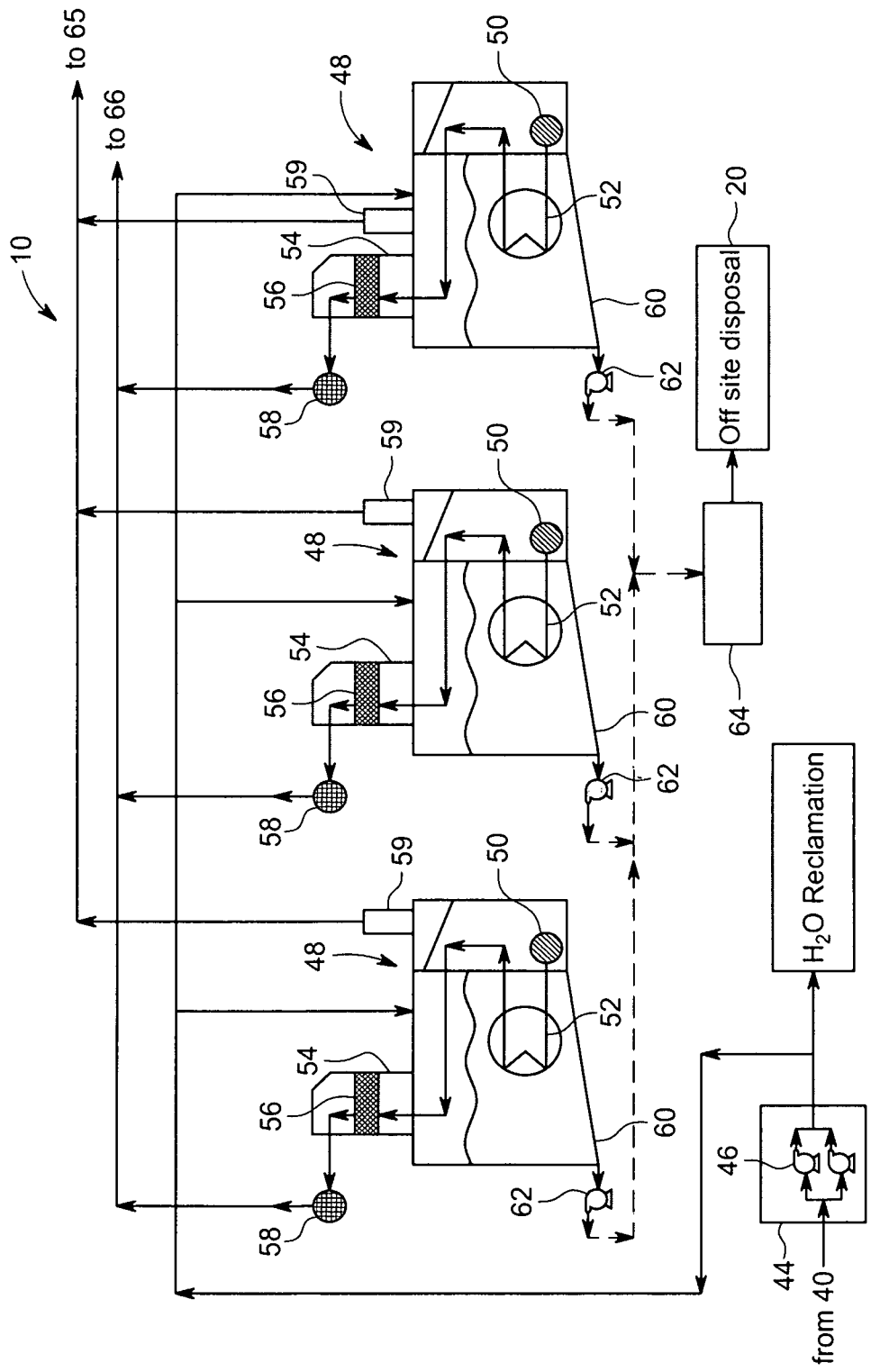
FIG. 2A is a flow chart of a second segment of the wastewater disposal system shown in FIG. 1.

As shown in FIG. 2A, one or more thermal evaporators 48 are connected to storage tank 44 to further separate any particulate matter from the liquid component of the effluent. Thermal evaporators 48 may be atmospheric evaporators such as those sold by Encon Industries, (Keene, N.H.), or vacuum-distilled-type evaporators such as those sold by Condorchem Envitech (Barcelona, Spain), that perform the evaporation function at much lower temperatures than atmospheric evaporators, i.e., much lower than the 212° F. temperature needed by atmospheric evaporators, due to the very low pressure in the vacuum evaporator system. Any type of evaporator may be structured to function as a distillation unit in which the evaporated liquids are condensed and captured for reuse. Any type of evaporator may be structured also as a pure evaporator in which the liquids are completely vaporized and allowed to escape to the atmosphere. It has been found that use of a thermal vacuum evaporator is especially advantageous when an autoclave unit is incorporated into the wastewater treatment system as disclosed hereinbelow.

Each thermal evaporator has a fuel source and a burner 50. Natural gas is the preferred fuel source as its combustion byproducts of $CO_2$ and $H_2O$ are usable in further processing steps disclosed hereinbelow. It should be understood that other fuel sources may be used to run the thermal evaporators such as electricity and fuel oil among others known in the art. If electricity is used, solar panels and passive electricity generation are the preferable source of the electricity. Treated effluent is transferred into the thermal evaporator(s) 48 and exposed to high heat via a heat exchanger 52. The heat exchanger causes the liquid component of the treated effluent to evaporate and travel upwardly into stack 54. Any particulate component separated from the liquid phase gets deposited on a sloped surface 60 that directs the particulates to an evaporator pump 62. Pump 62 forces the particulates to a residual's storage tank 64 for eventual disposal offsite.

Figure 2B:
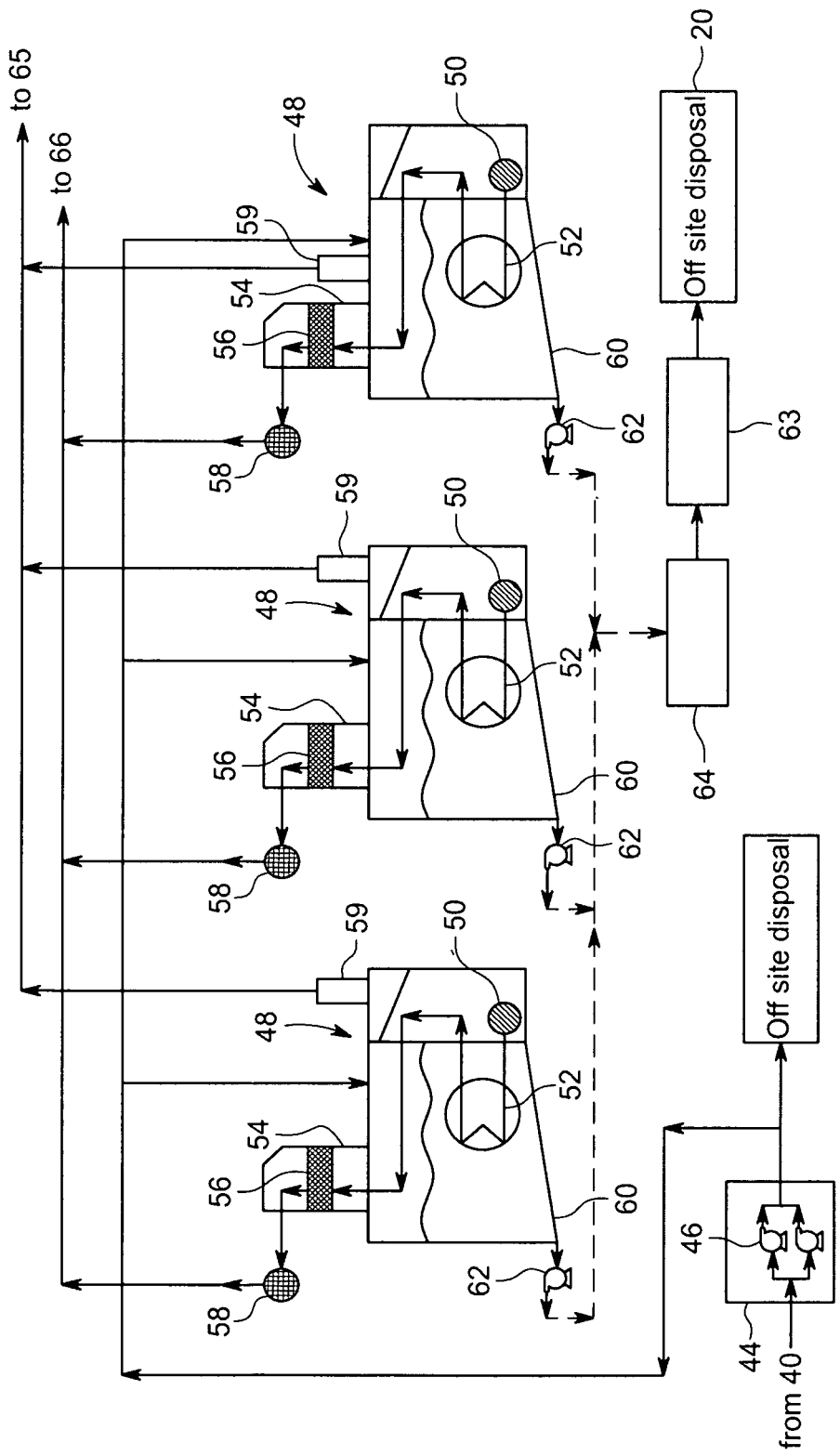
FIG. 2B is a flow chart of a second segment with a residual storage tank according to another embodiment of the disclosure.

As an optional pre-treatment or pre-disposal step, in those embodiments that do not have an autoclave unit, the particulate or sludge component derived from evaporator(s) 48 may be sent through an optional microwave unit to degrade and destroy harmful biological and chemical materials and compounds resident in the sludge. As shown in FIG. 2B, a microwave unit 63 is positioned in-line with storage tank 64. This ensures the sludge material shipped off-site is as inert as possible before final disposal. In a yet further alternative embodiment. A single microwave unit 63 may be positioned in-line with screen 18, WAS holding zone 26 and storage tank 64 to pre-treat all the particulates and sludge produced by filtration sub-system and evaporator sub-system.

The evaporated liquid component, which is almost 100% water vapor passes through a mist capture system 56. The water vapor next travels upwardly through a vent stack 58 that leads to a condenser 66 disclosed in more detail herein. At this point, the water vapor is essentially distilled water in vapor form. Any volatiles present in the effluent at the beginning of the process are removed prior to the treated effluent reaching storage tank 44 via the mist capturing device in the stacks of the atmospheric eliminator. If the autoclave unit(s) is/are present and utilized, all the volatiles and other inorganic and organic compounds will have been destroyed before evaporation.

Condenser 66 converts the water vapor to liquid water. A water storage tank 68 receives the water for partial use to irrigate carbon-capturing plants 70 planted in a greenhouse or hydroponic system 72. If a conventional greenhouse is used, water will be supplied with a sprayer or similar system. If a hydroponic system, the water will be added to the water supply of the hydroponic system, as needed. Greenhouse or hydroponic system 72 is an enclosure with at least one outlet 73 for the ingress and egress of air. A second outlet includes reversible fan 74 permits the relative pressure within greenhouse 72 to be positive or negative depending upon the processes being performed in the greenhouse or hydroponic system. A series of pipe and tubes extend from water storage tank 68 to provide regulated amounts of water to the individual plants 70. The water dissemination may be computer controlled to set parameters.

The balance of water stored in the food-grade storage tank may be directed and reused for other purposes in the building including replenishing water in rooftop A/C units, toilets, laundry room, on-site swimming pools, irrigation systems and offsite sale such as for offsite swimming pool water, irrigation systems, etc. Before reusing or redirecting the reclaimed water, it may require additional treatment(s) with ozonation, UV light and/or chlorination depending upon relevant federal, state and local regulations and ordinances.

Figure 3A:
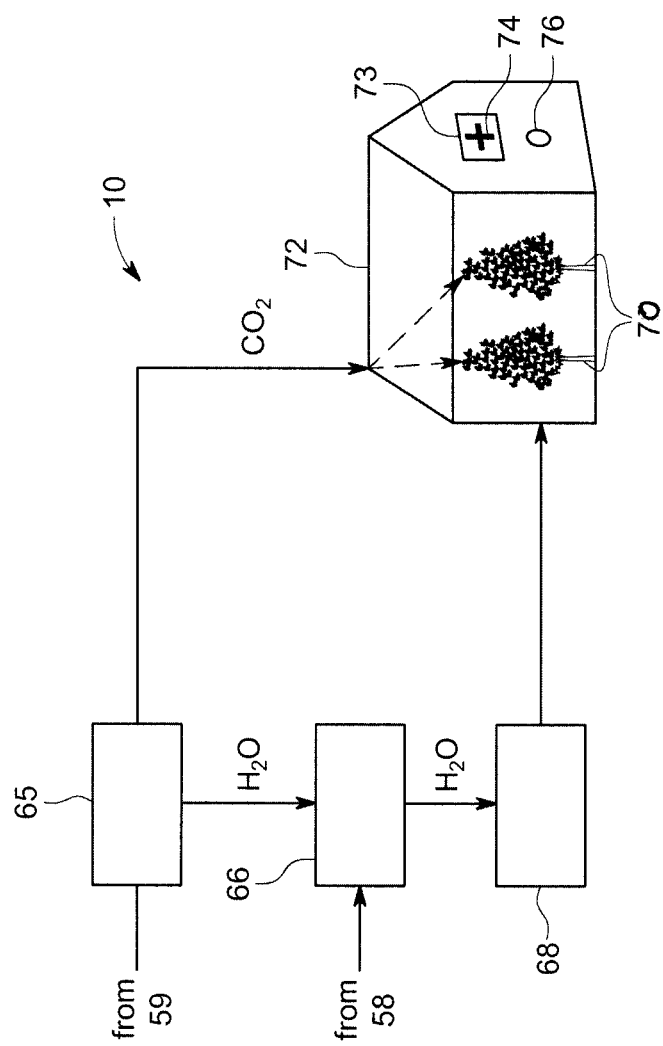
FIG. 3A is a flow chart of a third segment of the wastewater disposal system shown in FIG. 1.

Referring now to FIG. 3A, if natural gas is the fuel used to fire thermal evaporators 48, the combustion components of the natural gas, i.e., $CO_2$ and $H_2O$ are transferred via a dedicated vent 59 to a separator 65 used to separate the $CO_2$ from the $H_2O$. The $H_2O$ is transferred via pipe to condenser 66 so as to be combined with the water vapor component derived from the heat exchange process performed on the treated effluent. The $CO_2$ component is transferred via a dedicated pipeline into greenhouse 72.

Figure 3B:
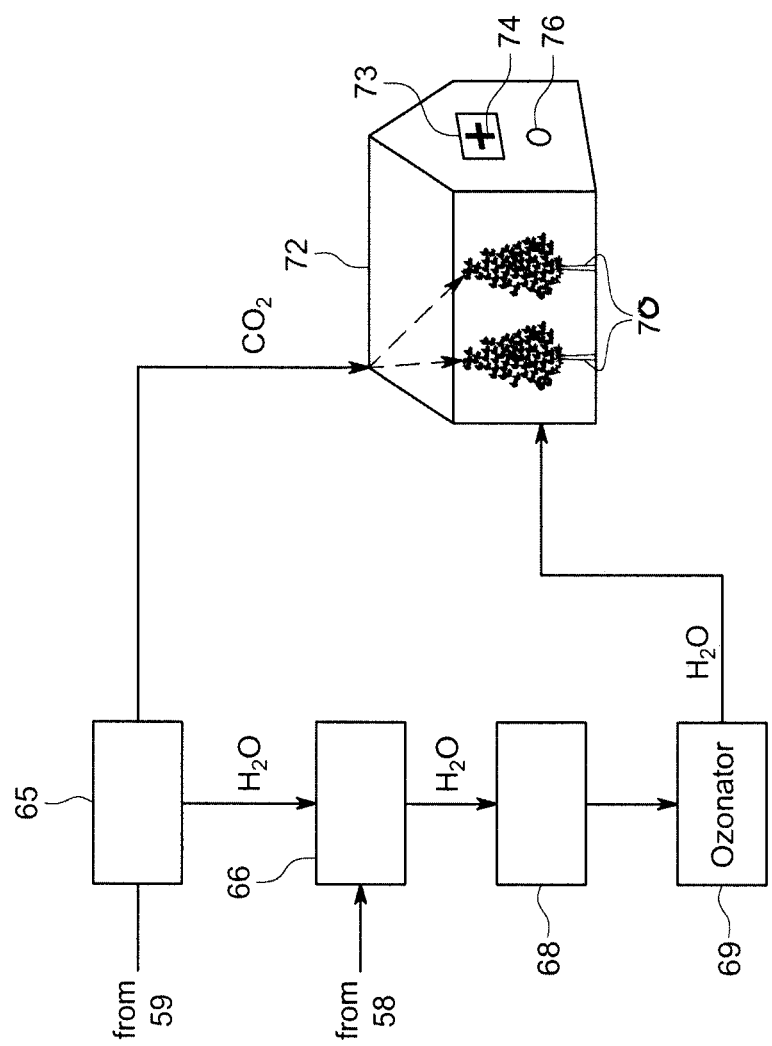
FIG. 3B is a flow chart of a third segment of a wastewater disposal system with an ozonation unit according to a further embodiment of the disclosure.

With respect to the water vapor captured and reduced to liquid water and prior to being stored in storage tank 68, to ensure the purity of the water, the water can be run through an ozonator unit 69 as shown in FIG. 3B. As is well known in the art, ozonation of water is an effective treatment for eliminating bromides and other harmful substances in water. And as a preferred method for storage of water in food-grade tanks (holding tank 68), a sampling port will be installed in the piping before and after treatment and before storage in order to test for total coliform, *E. coli*, heterotrophic plate counts (HPCs).

Figure 3C:
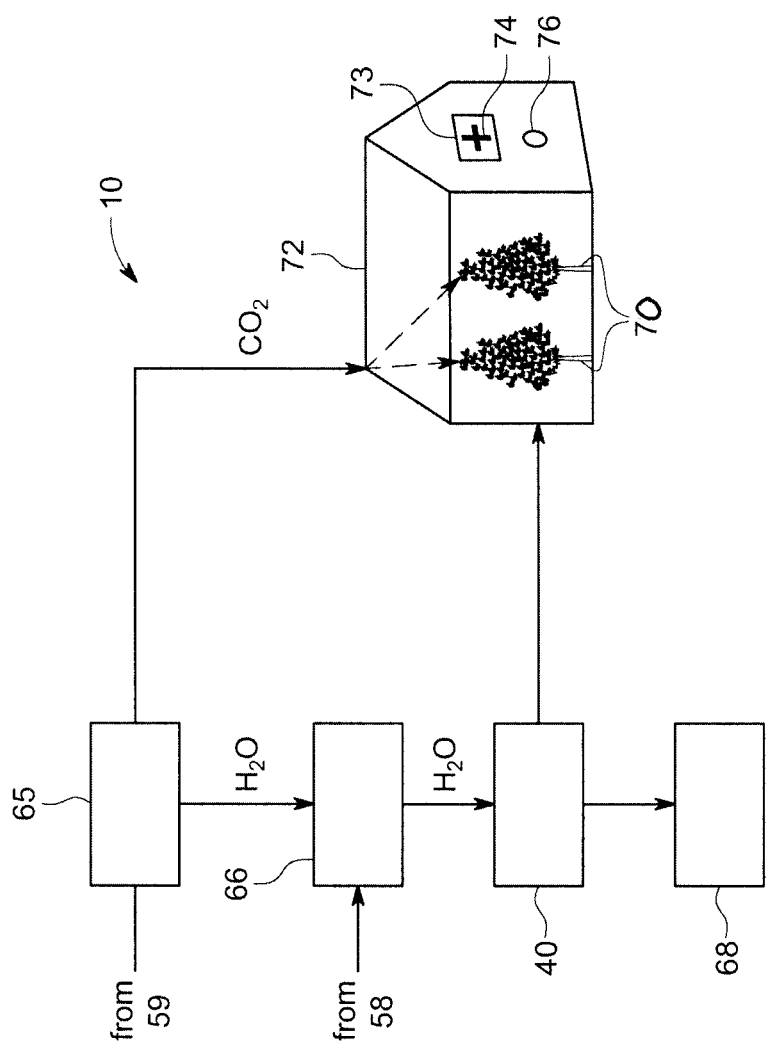
FIG. 3C is a flow chart of a third segment of a wastewater treatment system with a UV unit according to a still further embodiment of the disclosure.

In an alternative embodiment as shown in FIG. 3C, a UV unit 40 is positioned inline between condenser 66 and water holding tank 68 to ensure no bacteria or other potential pathogens are present in the water as a condition of reuse. Use of UV unit 40 may be enhanced also with the application of chlorination as an auxiliary purification source as is well known in the art to be a precondition of reusing the reclaimed water under some federal, state and/or local ordinances.

Referring now to the captured $CO_2$, the plants 70 are exposed to the $CO_2$ in order to absorb the $CO_2$ to perform the carbon-capture function. When $CO_2$ from the combustion of natural gas is introduced into greenhouse 72, the relative pressure of the greenhouse atmosphere is kept either neutral of slightly positive relative to the ambient atmospheric pressure outside the greenhouse. This is accomplished with fan 74. When $CO_2$ is not being pumped into greenhouse 72 from thermal evaporator(s) 48, fan 74 is operated to create a negative pressure in the greenhouse so as to pull carbon-dioxide-laden outside air into the greenhouse. This permits plants 70 to extract the $CO_2$ from the air and maintain their natural function to continue to capture and assimilate $CO_2$.

At least one $CO_2$ monitor 76 is placed in greenhouse 72 to ensure human-acceptable levels are maintained. Current average atmospheric levels run between about 350 to 400 parts per million concentration in air (depending on altitude). The system is designed to constantly monitor $CO_2$ concentration. If $CO_2$ levels are too high, fan 74 can be activated to blow the greenhouse air out into the atmosphere until an acceptable level of $CO_2$ is reached. The parameters used to set the $CO_2$ can be modified as needed for a particular application. The system may be designed with a default setting of blowing air out of greenhouse 72 in the event of a system failure to prevent carbon dioxide buildup.

All plants undergo carbon fixation as part of the natural processes performed by plants as well as algae and cyanobacteria. Although any species of plant may be used, plants that have the highest carbon fixation rates are preferred. By way of illustration and not limitation, several species of Hemp plants are particularly suitable for this use as they are known to have some of the highest carbon fixation rates in the Plant Kingdom. They are additionally advantageous as the leaves can be harvested for other uses such as the production of CBD oil.

In an alternate embodiment, if evaporator unit(s) 48 are used to completely evaporate the water component of the wastewater, separator 65, condenser 66, ozonation unit 69 and greenhouse 72 can be eliminated from system 10. If the energy source used to run evaporator unit(s) 48 is electric, the $CO_2$ capture components also are not needed and can be eliminated from system 10.

Referring to FIGS. 8-12, in another aspect of the disclosure, a wastewater treatment system shown generally as 10" includes a series of components to separate and reduce raw sewage into disposable solids and reusable liquids brought to the system by a building plumbing system and the addition of one or more continuous-cycle autoclave units. The autoclave unit destroys harmful chemical compounds such as PFAS into inert compounds to ensure water removed from system 10" is essentially free of any harmful chemical compounds as well as any organic and microbial pathogens. As used herein, identical reference characters having differently primed or unprimed variations and assigned to features are intended to identify different embodiments of the same feature.

In similar fashion to the embodiment shown in FIG. 1A, the raw sewage is first deposited into one or more pretreatment tanks 12" that function as septic tanks to separate grease, grit and primary solids from the liquid component of the wastewater. The solids component is shipped offsite according to means used with conventional septic systems as is known in the art. The clarified liquid component is transferred via pipe system to one or more flow equalization tanks 14" that each include one or more influent pumps 16". Pumps 16" are used to force the clarified liquid through a fine screen 18" before further transfer in system 10".

Any particulate matter filtered out by screen 18" is shipped offsite with the solids component derived from pretreatment tank(s) 12". An optional influent composite sampling tap 22" may be placed in the piping system downstream of screen 18" to monitor the composition of the clarified and filtered liquid or influent before entry into other components of system 10" downstream of screen 18". It should be understood that "influent" as used in this context concerns fluids to be introduced into an evaporator component of system 10". This permits adjustment of the pretreatment tank(s) and filter screen to produce influent with the degree of clarity necessary to meet state, federal and local requirements.

Once the clarified liquid has been screened, it is transferred next to a membrane bioreactor shown generally as 23". Bioreactor 23" is a multi-component subassembly with an anoxic zone 24", waste activated sludge holding and storage zone 26", a first membrane bioreactor basin 30" and a second membrane bioreactor basin 28". The four separate treatment zones each further reduce particulate matter in the influent to further clear the fluids.

The clarified liquid first enters anoxic zone 24" to remove any dissolved oxygen in the liquid. Once the liquid has been cycled through anoxic zone 24", it is transferred through bioreactor 23" via one or more transfer pumps 32" incorporated into bioreactor 23". The oxygen-depleted liquid or influent is moved by transfer pump(s) 32" from anoxic zone 24" to membrane basins 28" and 30". Membrane basins 28" and 30" each include one or more filter membrane units that further filter out particulate matter in the clarified liquid. One or more blowers 34" flow pressurized air into the membrane basins to create a positive pressure environment to increase the filter rate of the membrane basins. Blowers 34" also flow pressurized air into anoxic zone 24" and WAS holding zone 26" to also increase the pressure in the bioreactor segments to improve flow through bioreactor 23".

The filtrate or permeate component of the filtered liquid is drawn into a clean-in-place unit 36" by one or more inline permeate pumps 38". Pumps 38" urge the filtrate or permeate into ultraviolet disinfection units 40" ("UV disinfection units"). Once treated with ultraviolet light in the UV disinfection units 40", the treated liquid is transferred to a continuous-cycle autoclave 80.

Figure 11:
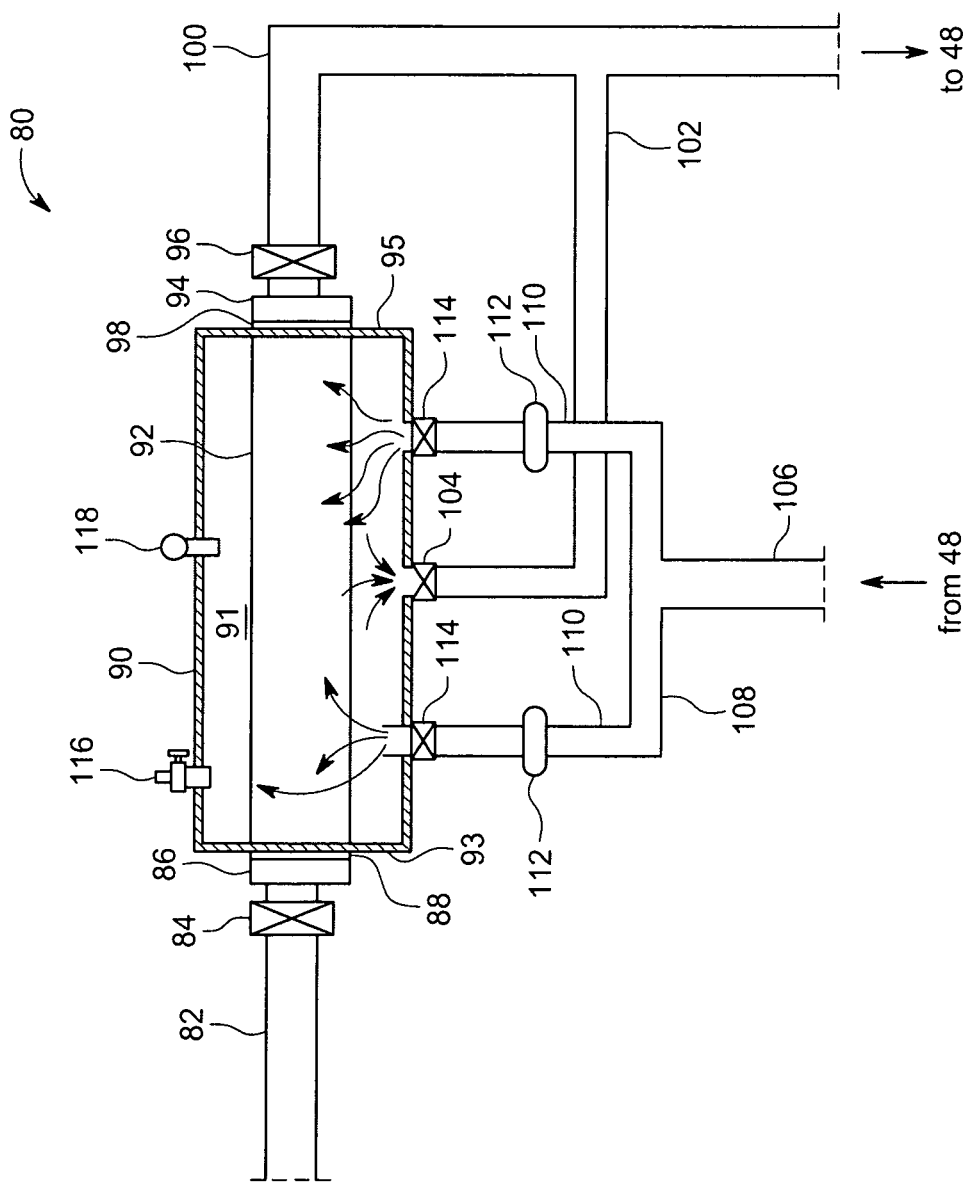
FIG. 11 is a side view in elevation of an autoclave unit according to the embodiments of the disclosure shown in FIGS. 8-10.
Figure 12:
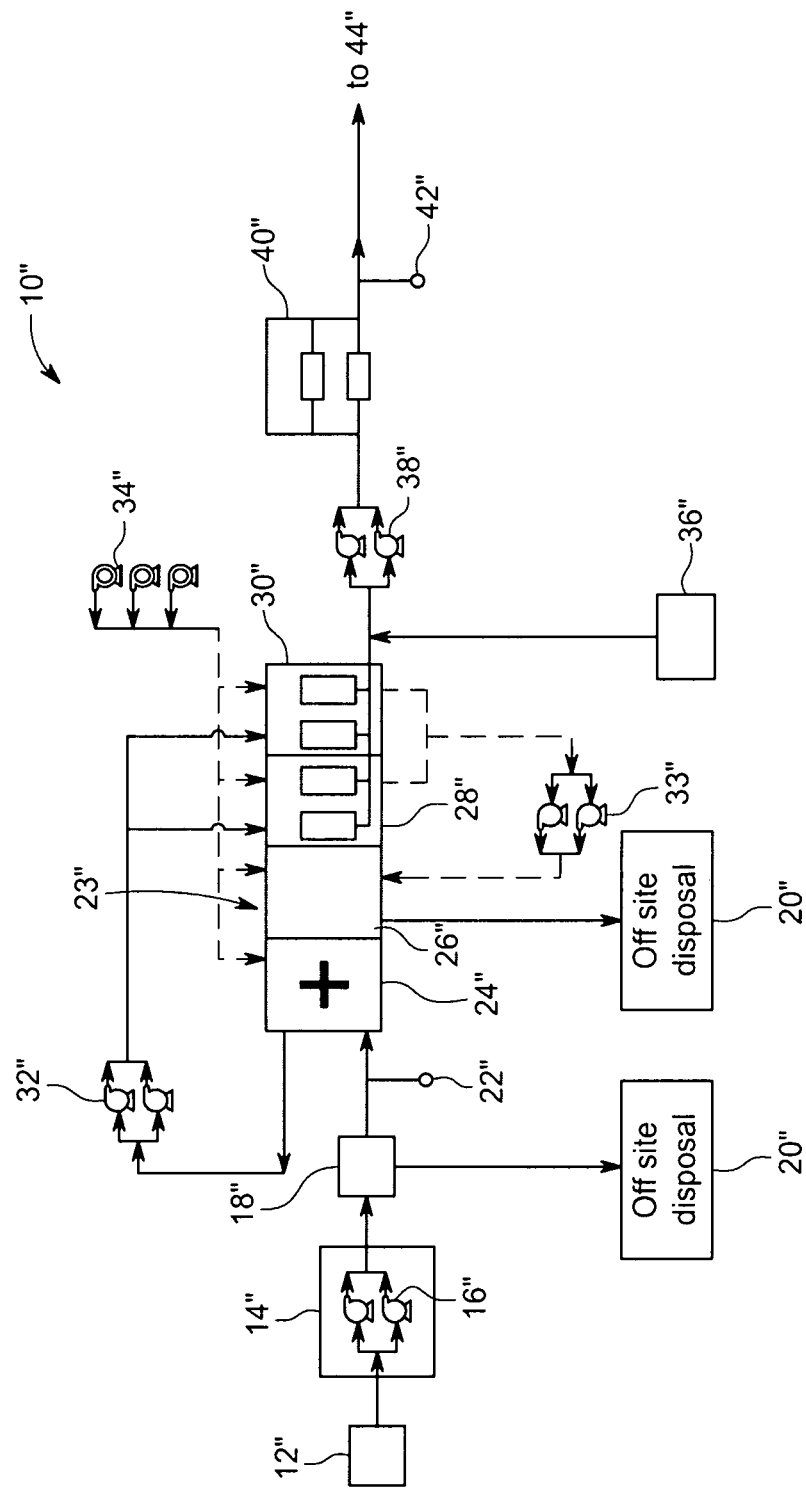
FIG. 12 is a flow chart of a first segment of a wastewater disposal system according to yet another embodiment of the disclosure.

As shown in FIG. 11, autoclave unit 80 includes an inlet pipe 82 for transferring the treated liquid to the autoclave. Inlet pipe 82 may be formed from 304 stainless steel piping. An automatic inlet valve 84 positioned in line with inlet pipe 82 controls the flow of treated liquid into the autoclave unit. Valve 84 may be manual or automated. An inlet collar 86 secured to an end of inlet pipe 82 transitions the pipe to a proximal end of an autoclave pipe 92. Inlet collar 86 and autoclave pipe 92 both may be fabricated from 316 stainless steel and can be connected using NPT threading as is known in the art. A distal end of autoclave pipe 92 is secured to an outlet collar 94 (which can be connected via NPT threading) that transitions the autoclave pipe 92 to outlet pipe 100 and to an outlet automated valve. Outlet pipe 100 is connected to an effluent tank 44'. An outlet valve 96 positioned in line with outlet pipe 100 controls the flow of treated liquid out of the autoclave unit. Valve 96 may be automated in synchronized fashion with valve 84. The purpose of activating both valves automatically and in sync is to ensure proper control of the treatment time within the autoclave so that the desired temperature (approximately 400° F.) and pressure (approximately 20-30 psi) are achieved for approximately 20-25 minutes.

To create the elevated heat and pressure conditions of an autoclave, an autoclave jacket 90 is formed about autoclave pipe 92. In one embodiment, autoclave jacket 90 is cylindrical and superposed about autoclave pipe 92 to create an annular chamber 91 around the pipe. An inlet jacket end 93 is sealed around autoclave pipe 92 with an inlet gasket 88. Inlet gasket 88 is structured to withstand the high temperatures and pressures of the autoclave unit 80. An outlet jacket end 95 is sealed around autoclave pipe 92 with an outlet gasket 98. Outlet gasket 98 is structured to withstand the high temperatures and pressures of autoclave unit 80. The inlet collar 86 and outlet collar 94 are constructed such as to ensure the containment of the pressure and temperature according to boiler standards ASME. Autoclave jacket 90 and its associated structures may be insulated to maximize the efficiency of the autoclave unit 80.

Autoclave unit 80 is structured to generate temperatures between 400° F. and 600° F. and pressures between 20 psi and 30 psi within autoclave pipe 92. To achieve these parameters, steam generated by evaporator(s) 48 is fed into chamber 91 with a series of pipes. A main delivery pipe 106 attached to, and in fluid communication with, evaporator(s) 48 splits into two or more secondary steam delivery pipes 110 that feed directly into jacket 90. Pressure regulators 112 are positioned in line with secondary delivery pipes 112 to control the pressure generated in jacket 90 that directly affects the pressure in autoclave pipe 92. Steam supply valves 114 control the flow of steam into jacket 90. One or more steam exhaust pipes 102 are secured to jacket 90 and in fluid communication with chamber 91 to relieve or remove pressure from the autoclave unit 80. An exhaust valve 104 controls the flow of steam out of jacket 90. An optional screen 105 may be placed at the jacket/exhaust pipe junction to prevent any contaminants in jacket 90 from being passed to evaporator(s) 48. A distal end of exhaust pipe(s) 105 are connected directly or indirectly to evaporator(s) 48.

To ensure proper sterilizing conditions and to ensure operation in a safe manner, a safety valve 116 is secured to jacket 90. Safety valve 116 may be in the form of a pressure/temperature valve used on an oil-fired furnace to bleed off steam if the temperature and/or pressure exceed preselected ceiling values. A pressure and/or temperature gauge may also be secured to jacket 90 to monitor the pressure and/or temperature within jacket 90. Control of the temperature and pressure within jacket 90 may be automated and coordinated with the various valves used to introduce effluent into autoclave 80 as well as the valves used to introduce steam into the autoclave and to release steam from the autoclave.

As a backup system, electrically-generated heat may be used to increase the temperature and pressure within autoclave 80 to the desired levels for chemical compound destruction. For this backup system, a heating wire or thermostatic system 97 is coiled around autoclave pipe 92.

Figure 9:
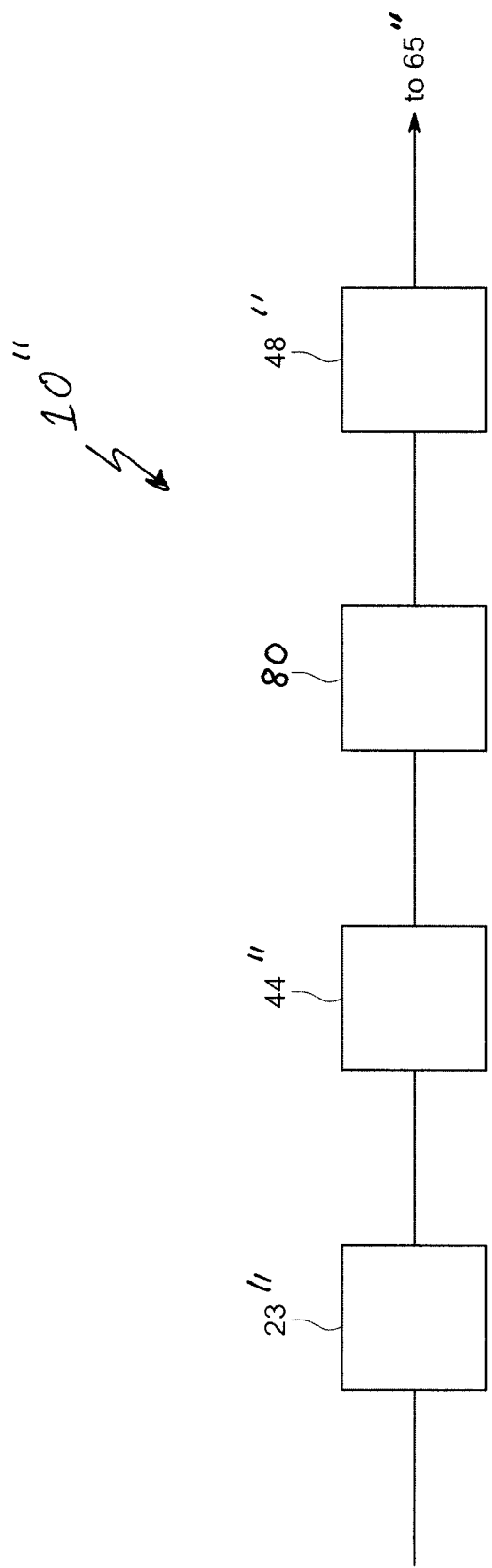
FIG. 9 is a flow chart of a wastewater treatment system with an autoclave unit according to still another embodiment of the disclosure.

Referring now to FIG. 9, in an alternative embodiment, UV unit(s) 40 are eliminated from the system. This is made possible by autoclave unit 80 that can destroy and degrade any organic and microbial life and microscopic pathogens that would otherwise be degraded and possibly destroyed by UV unit(s) 40 or ozonation. Any effluent treated in autoclave unit 80 will be sufficiently inert for further processing by evaporator unit(s) 48".

Figure 10:
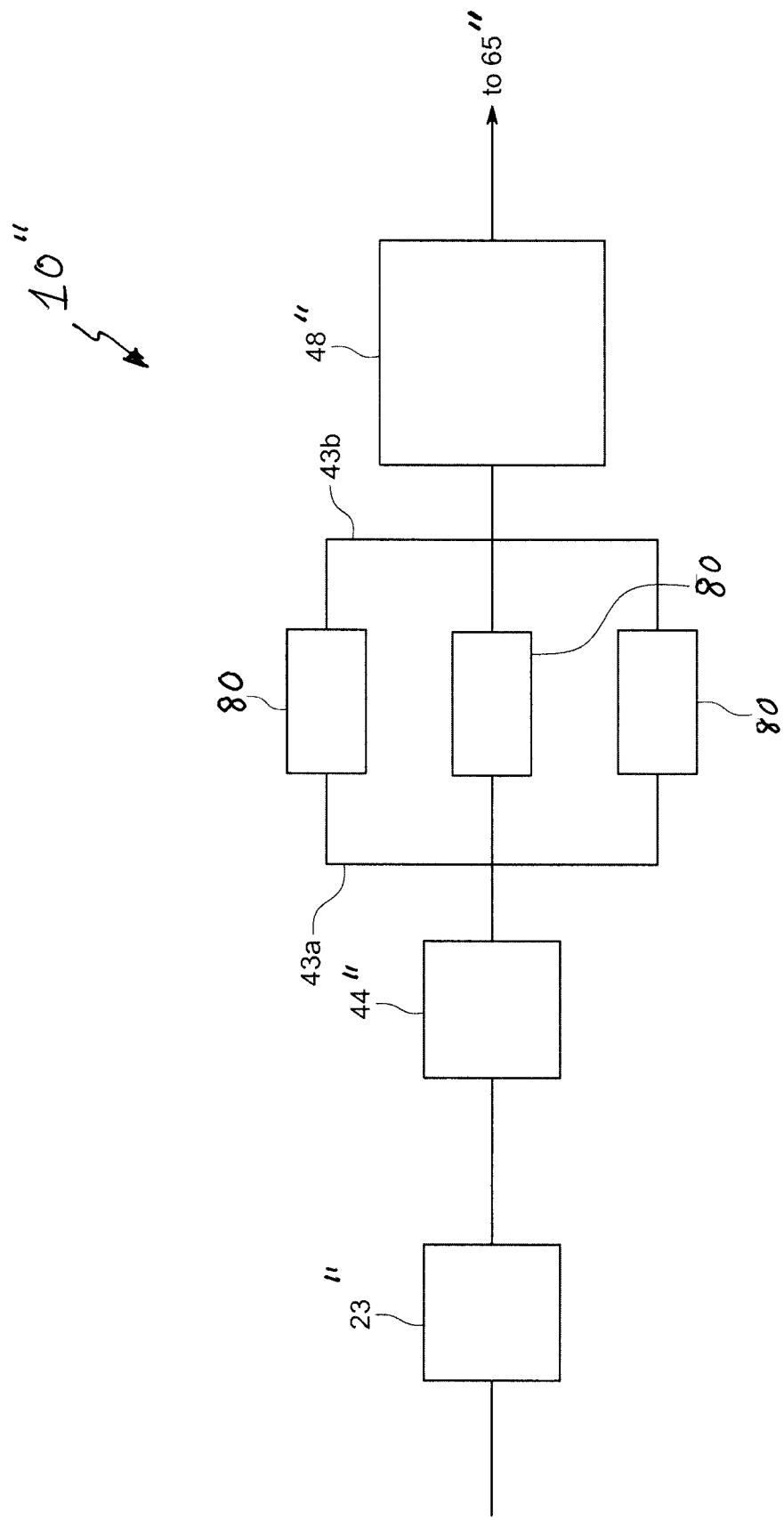
FIG. 10 is a flow chart of a wastewater treatment system with a plurality of autoclave units secured to a manifold according to a still further embodiment of the disclosure.

Referring now to FIG. 10, in a further alternative embodiment, a plurality of autoclave units 80 are arranged in parallel with an autoclave manifold. An intake manifold 43a connected after the filtration system or the optional UV unit(s) directs effluent treated in the filtration system and the optional UV unit(s) 40" into the multiple autoclave units 80 from the post-treatment storage tank and before the autoclave unit(s). This enables system 10" to handle much larger volumes of effluent over a specified time period. Intake manifold 43a may include valves dedicated to each branch of the manifold to selectively direct effluent to one or more autoclave units as needed to handle the particular effluent volume in a given time. The valves also function as inlet valves 84 to close off the autoclave unit(s) when in use. Having multiple autoclave units also provides the ability to take one or more offline for servicing while leaving one or more units online to handle effluent loads.

Prior to connecting the multiple autoclave units 80 to evaporator unit(s) 48", an outtake manifold 43b has dedicated ports for each autoclave unit 80 to deliver the treated effluent downstream from the autoclave units 80. Outtake manifold 43b may include valves 96 dedicated to each branch of the outtake manifold to selectively close an autoclave unit in operation. Once the effluent treatment operation is completed, the valve is opened and the treated effluent is directed to evaporator unit(s) 48".

To destroy or degrade harmful chemical compounds such as PFAS, effluent transferred and retained in autoclave pipe 92 is exposed to heat and pressure approximately 20 minutes to allow sufficient time to effectively destroy and degrade all the harmful substances, organic, inorganic and/or microbial, in the effluent. It should be understood the effluent resident time in the autoclave pipe can be modified without departing from the spirit and scope of the disclosure. Once the cycle has been completed, outlet valve 96 is opened and the heated effluent is transferred to the evaporator(s) via outlet pipe 100. To start a new cycle, inlet valve 84 is opened while outlet valve 96 is closed. Once autoclave pipe 92 is filled, inlet valve 84 is closed and the process is repeated.

Once the liquid has been processed by autoclave unit 80, the fluid is directed to an effluent storage tank 44" to await further processing. An effluent 24-hour composite sampling tap 42" is connected to the line between units 40" and storage tank 44" to permit round-the-clock sampling and evaluation of the treated liquid.

The particulate or sludge component derived from the filtration of the clarified liquid is pumped out of membrane basins 28" and 29" into a WAS holding zone 26" via waste-activated sludge pumps 33". The contents of the holding compartment 26" is removed from the compartment and taken offsite for disposal 20" along with the screened particulate matter previously described.

Effluent pumps 46" positioned in effluent storage tank 44" pump the treated liquid stored in the tank onto one of two tracks. The first track is for reuse as toilet water as the treated liquid meets the requirements for classification as Class A reclaimed water as required by EPA standards and local environmental regulations. A dedicated pipe system connects storage tank 44" to one or more toilets in a building to provide the reclaimed water for use or for other uses allowed for reusable water. A secondary line from the main water lines is also used in the event there is insufficient reclaimed water to meet usage rates. It is anticipated that 30% of the treated effluent may be used for this purpose. Otherwise, or in addition thereto, the treated effluent can be transferred to one or more thermal evaporators 48" for further processing via a second branching pipe line from storage tank 44".

Figure 13:
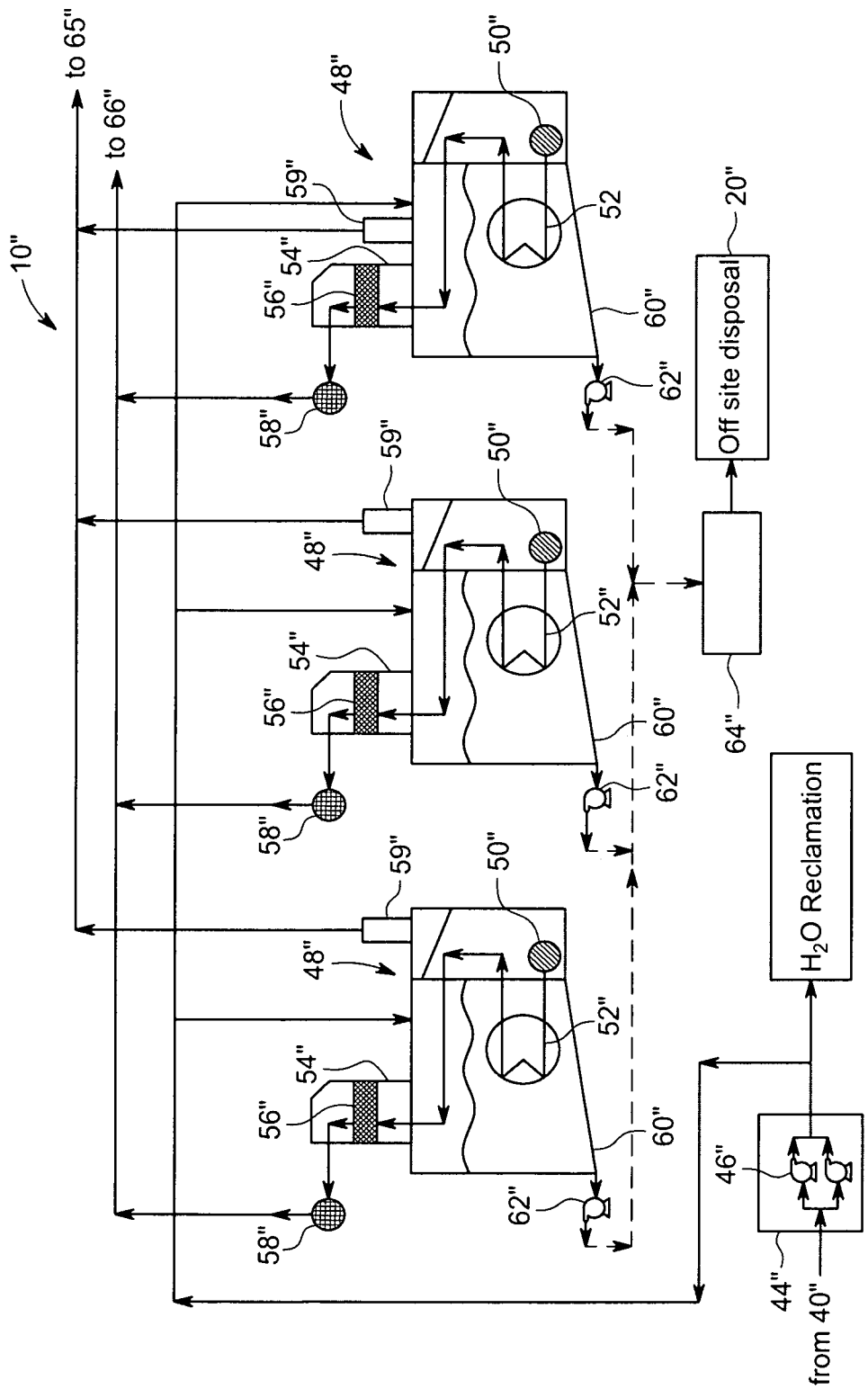
FIG. 13 is a flow chart of a second segment of the wastewater disposal system shown in FIG. 12.

As shown in FIG. 13, one or more thermal evaporators 48" are connected to storage tank 44" to further separate any particulate matter from the liquid component of the effluent. Each thermal evaporator has a fuel source and a burner 50". Natural gas is the preferred fuel source as its combustion byproducts of $CO_2$ and $H_2O$ are usable in further processing steps disclosed hereinbelow. It should be understood other fuel sources may be used to run the thermal evaporators such as electricity and fuel oil among others known in the art. If electricity is used, solar panels and passive electricity generation are the preferable source of the electricity. Treated effluent is transferred into the thermal evaporator(s) 48" and exposed to high heat via a heat exchanger 52". The heat exchanger causes the liquid component of the treated effluent to evaporate and travel upwardly into stack 54". Any particulate/sludge component separated from the liquid phase gets deposited on a sloped surface 60" that directs the particulates to an evaporator pump 62". Pump 62" forces the particulates to a residual's storage tank 64" for eventual disposal offsite.

The evaporated liquid component, which is almost 100% water vapor passes through a mist capturing system 56". The water vapor next travels upwardly through a vent stack 58" that leads to a condenser 66" disclosed in more detail herein. At this point, the water vapor is essentially distilled water in vapor form. Any volatiles present in the effluent at the beginning of the process are removed prior to the treated effluent reaching storage tank 44" via the mist capturing system 56.

Condenser 66" converts the water vapor to liquid water. A water storage tank 68" (which may be a food-grade storage tank), receives the water for partial use to irrigate carbon-capturing plants 70" planted in a greenhouse 72". Greenhouse 72" is an enclosure with at least one outlet 73" for the ingress and egress of air. A second outlet includes reversible fan 74" permits the relative pressure within greenhouse 72" to be positive or negative depending upon the processes being performed in the greenhouse. A series of pipe and tubes extend from water storage tank 68" to provide regulated amounts of water to the individual plants 70". The water dissemination may be computer controlled to set parameters.

Figure 14:
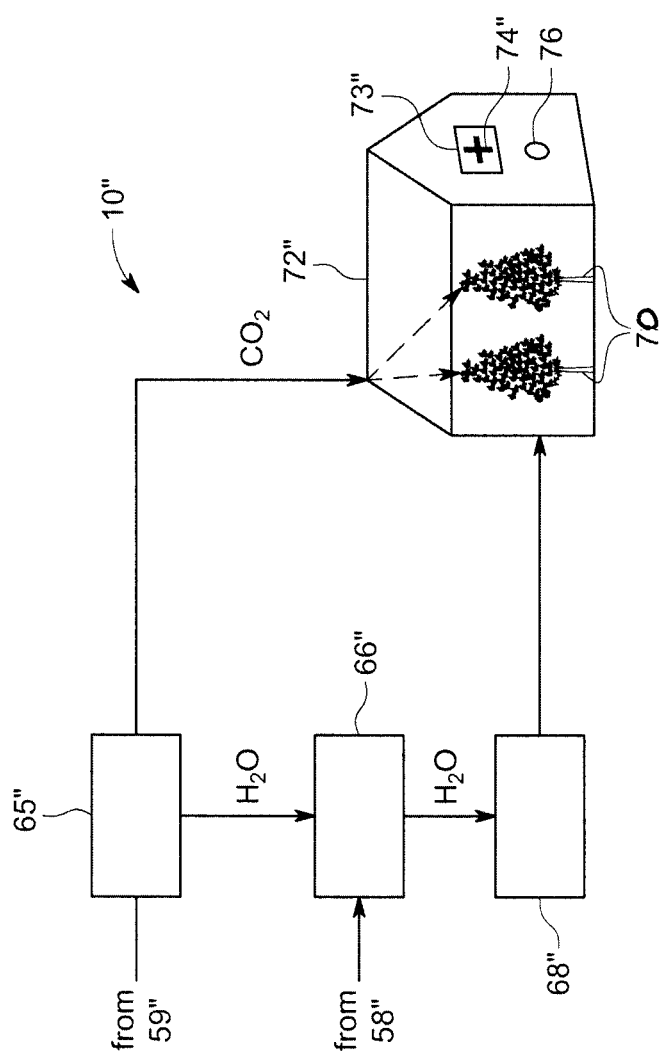
FIG. 14 is a flow chart of a third segment of the wastewater disposal system shown in FIG. 12.

Referring now to FIG. 14, if natural gas is the fuel used to fire thermal evaporators 48", the combustion components of the natural gas, i.e., $CO_2$ and $H_2O$ are transferred via a dedicated vent 59" to a separator 65" used to separate the $CO_2$ from the $H_2O$. The $H_2O$ is transferred via pipe to condenser 66" so as to be combined with the water vapor component derived from the heat exchange process performed on the treated effluent. The $CO_2$ component is transferred via a dedicated pipeline into greenhouse 72".

The plants 70" are exposed to the $CO_2$ in order to absorb the $CO_2$ to perform the carbon-capture function. When $CO_2$ from the combustion of natural gas is introduced into greenhouse 72", the relative pressure of the greenhouse atmosphere is kept either neutral of slightly positive relative to the ambient atmospheric pressure outside the greenhouse. This is accomplished with fan 74". When $CO_2$ is not being pumped into greenhouse 72" from thermal evaporator(s) 48", fan 74" is operated to create a negative pressure in the greenhouse so as to pull carbon-dioxide-laden outside air into the greenhouse. This permits plants 70" to extract the $CO_2$ from the air and maintain their natural function to continue to capture and assimilate $CO_2$.

At least one $CO_2$ monitor 76" is placed in greenhouse 72" to ensure human-acceptable levels are maintained. Current average atmospheric levels run between about 350 to 400 parts per million concentration in air (depending on altitude). The system is designed to constantly monitor $CO_2$ concentration. If $CO_2$ levels are too high, fan 74" can be activated to blow the greenhouse air out into the atmosphere until an acceptable level of $CO_2$ is reached. The parameters used to set the $CO_2$ can be modified as needed for a particular application. The system may be designed with a default setting of blowing air out of greenhouse 72" in the event of a system failure to prevent carbon dioxide buildup.

Figure 4:
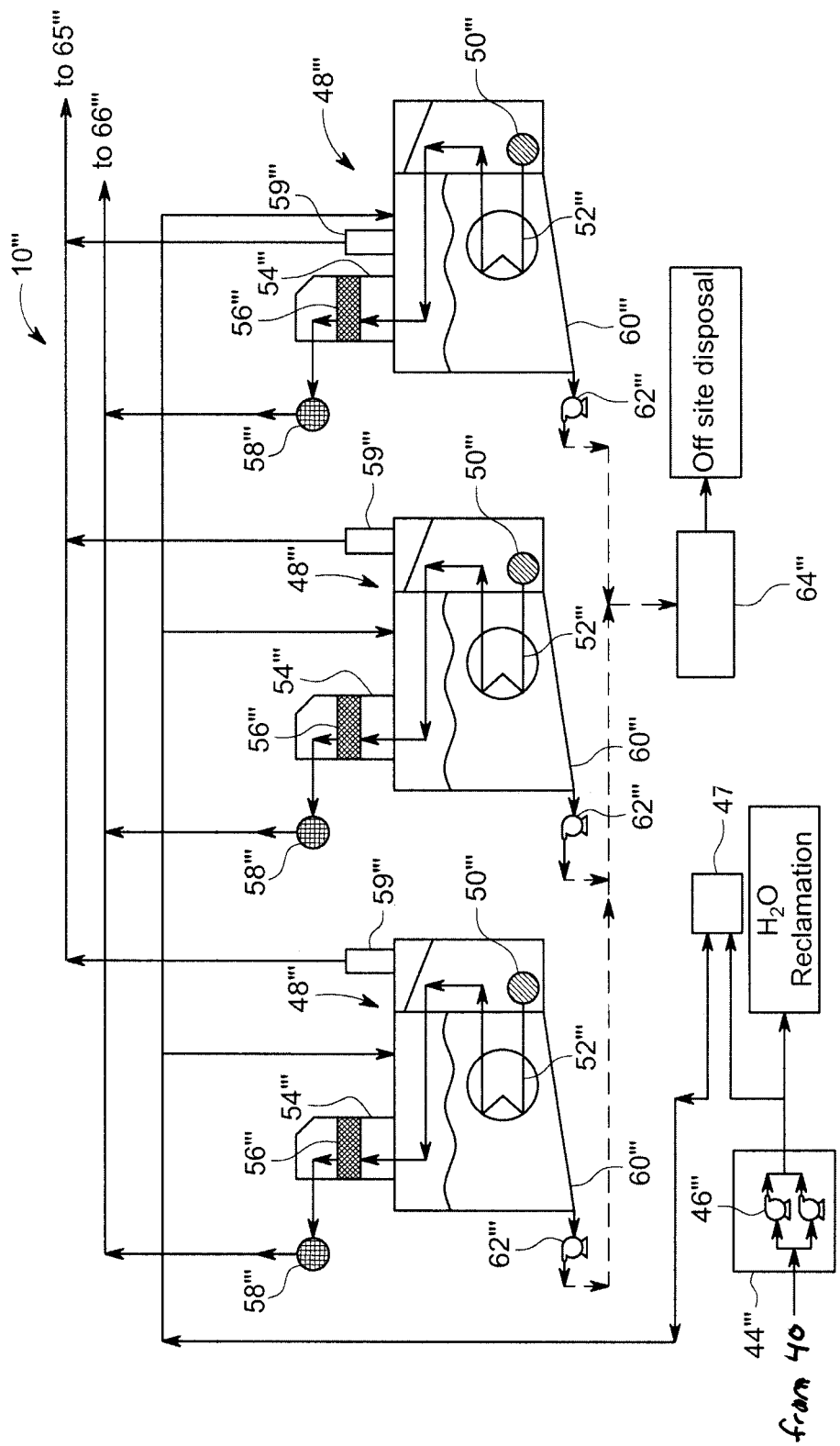
FIG. 4 is a flow chart of a filtration segment of a wastewater disposal system with a microwave device according to another embodiment of the disclosure.
Figure 5:
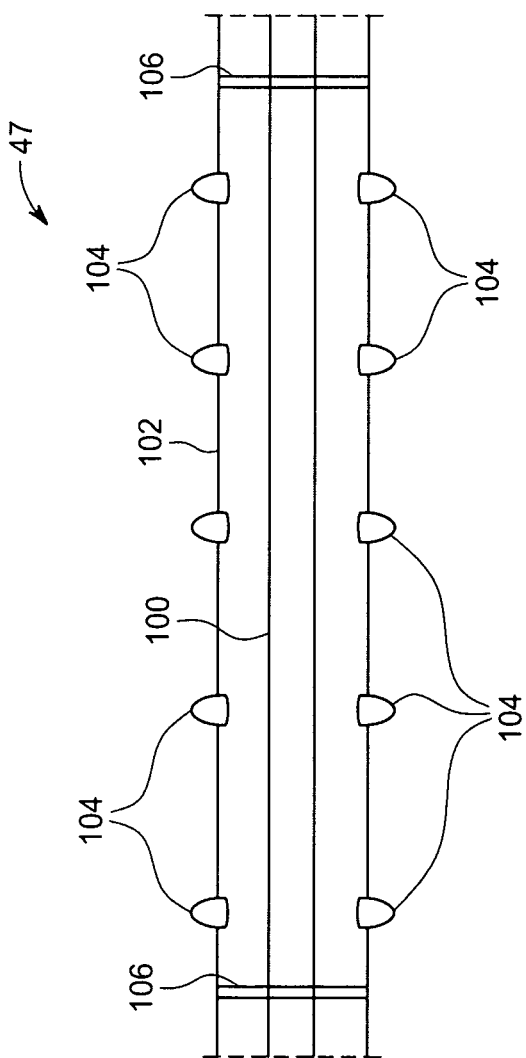
FIG. 5 is a side view of a sonolysis unit according to a further embodiment of the disclosure.
Figure 6:
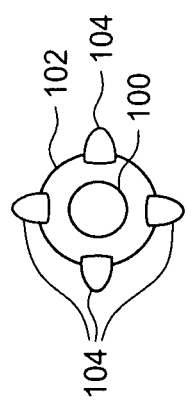
FIG. 6 is an end view of the sonolysis unit shown in FIG. 5.
Figure 7:
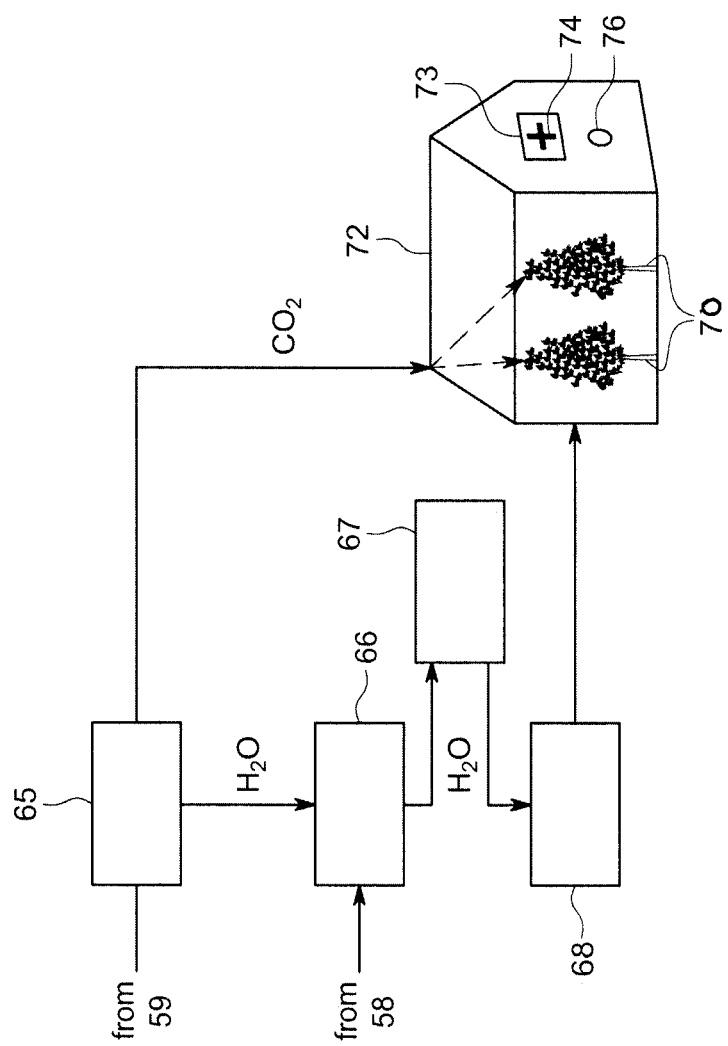
FIG. 7 is a flow chart of a third segment of a wastewater treatment system with an ozonation unit added according to yet another embodiment of the disclosure.
Figure 8:
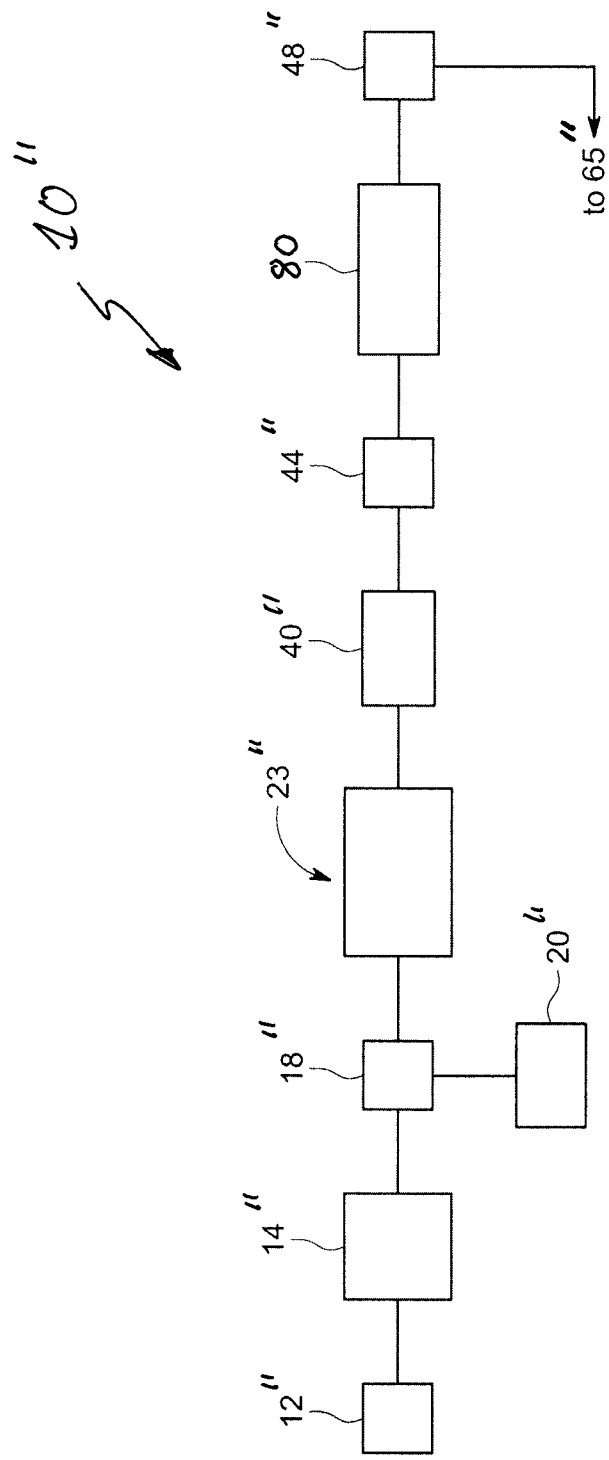
FIG. 8 is a flow chart of a wastewater treatment system with a UV unit and an autoclave unit according to a yet further embodiment of the disclosure.

In a yet further aspect of the disclosure shown in FIG. 4, one or more sonolysis units may be incorporated into the wastewater treatment system, designated generally as 10''' in place of, or in addition to, autoclave unit(s) 80 downstream from a holding tank 44'''. Referring now to FIGS. 4-6, a sonolysis unit, shown designated generally as 47 provides an alternative or additional means to destroy and degrade pathogenic microbial life and hazardous chemical compounds. Sonolysis unit 47 includes a sonolysis tube 100 made from a rigid material such as stainless steel to withstand the high-heat and temperature environment of the unit. Unit 47 is coaxially arranged in a cylindrical outer jacket 102 that supports a plurality of sound transducers 104. The transducers may be positioned equidistantly along the length of jacket 102. Valves 106 positioned at the ends of tube 100 permit the controlled entry and exit of effluent for treatment. Valves 106 are synchronized to permit the entry of a bolus of fluid for treatment and the exit of the bolus of fluid after treatment. The valves are synchronized like the valves of the autoclave unit.

An annular chamber formed between sonolysis tube 100 and jacket 102 is filled with a liquid to enhance the energy transfer when sound transducers 104 are activated. The sound waves produced create cavitation of the effluent in tube 100, which forms bubbles within tube 100. The bubbles form in an adiabatic environment in which the temperature and pressures within the bubbles can reach 5000° C. and twenty times atmospheric pressure while the temperature and pressure of the effluent can remain at atmospheric levels. This high-heat, high-pressure environment of the bubbles destroys any chemical compounds caught in the bubbles. The effluent is exposed to the sonolysis procedure for approximately 20 minutes or more. After the designated time, the treated effluent is transferred out of the tube an into evaporator unit(s) 48".

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patent is:

1. A wastewater treatment and management system comprising:
   at least one pre-treatment tank for receiving raw sewage comprising, grease, grit, primary solids and liquids including water, wherein the at least one pre-treatment tank separates solids from liquids;
   at least one flow equalization tank connected via piping to the at least one pre-treatment tank, wherein the flow equalization tank is in fluid communication with the at least one pre-treatment tank;
   at least one influent pump connected to the at least one flow equalization tank via piping;
   at least one screen connected to the influent pump and flow equalization tank via piping, wherein the at least one screen filters out additional solids from the liquids to produce clarified liquids;
   an influent composite sampling tap connected to, and downstream from, the at least one screen via piping, wherein the influent composite sampling tap is used to retrieve influent samples for evaluation to monitor the composition of the liquids clarified and filtered by the at least one screen;
   at least one membrane bioreactor connected to the at least one screen and sampling tap via piping, wherein the at least one membrane bioreactor filters the clarified liquids;
   at least one pump connected to, and downstream from, the at least one membrane bioreactor via piping;
   at least one effluent storage tank connected to, and downstream from, the at least one pump via piping;
   at least one autoclave connected to, and downstream from, the at least one effluent storage tank.

2. The wastewater treatment and management system of claim 1 further comprising at least one ultraviolet disinfection unit connected to, and downstream from, the at least one effluent storage tank via piping, and connected to, and upstream from, the at least one autoclave via piping.

3. The wastewater treatment and management system of claim 1 further comprising a condenser connected to, and downstream from, the at least one thermal evaporator to condense water vapor created by the at least one evaporator.

4. The wastewater treatment and management system of claim 3 further comprising a water storage tank connected to, and downstream from, the condenser for receiving water vapor condensed into water by the condenser.

5. The wastewater treatment and management system of claim 1 wherein each of the at least one autoclave comprises an autoclave pipe, wherein the autoclave pipe includes with an inlet collar at a proximal or upstream end of the autoclave pipe, and an outlet collar at a distal or downstream end of the autoclave pipe, and further includes an autoclave jacket secured about the autoclave pipe, wherein the autoclave jacket is further and secured to the ends of the autoclave pipe with an inlet jacket end secured to the proximal end of the autoclave pipe and an outlet jacket end secured to the distal end of the autoclave pipe, wherein the combination of the autoclave jacket, inlet jacket end, outlet jacket end and autoclave pipe of each of the at least one autoclave form a chamber in each of the at least one autoclave.

6. The wastewater treatment and management system of claim 5 further comprising at least one inlet valve positioned upstream of the proximal end of the at least one autoclave pipe of each of the at least one autoclave and an outlet valve positioned downstream of the distal end of the autoclave pipe of each of the at least one autoclave, wherein the at least one inlet valve and the at least one outlet valve are in fluid communication with the at least one autoclave pipe of each of the at least one autoclave.

7. The wastewater treatment and management system of claim 6 further comprising at least one steam delivery pipe connected between each of the at least one autoclave and the at least one thermal evaporator for transferring steam generated by the at least one thermal evaporator to the chamber each of the at least one autoclave.

8. The wastewater treatment and management system of claim 7 further comprising at least two secondary delivery pipes each connected at one end to, and in fluid communication with, the at least one steam delivery pipe and each connected at a second end to, and in fluid communication with, the at least one autoclave jacket of each of the at least one autoclave, wherein at least one pressure regulator is connected in-line with each secondary delivery pipe.

9. The wastewater treatment and management system of claim 8 further comprising at least one steam exhaust pipe connected to the at least one autoclave jacket of each of the at least one autoclave, and in fluid communication with the chamber of each of the at least one autoclave, and connected to, and in fluid communication with, the at least one thermal evaporator at a second end, wherein the at least one steam exhaust pipe includes a valve.

10. The wastewater treatment and management system of claim 9 wherein each of the at least one autoclave further comprises a temperature/pressure relief valve and a pressure regulator secured to the autoclave jacket of each of the at least one autoclave.

11. A wastewater treatment and management system comprising:
    at least one pre-treatment tank for receiving raw sewage comprising, grease, grit, primary solids and liquids including water, wherein the at least one pre-treatment tank separates solids from liquids;
    at least one flow equalization tank connected via piping to the at least one pre-treatment tank, wherein the flow equalization tank Is in fluid communication with the at least one pre-treatment tank;
    at least one influent pump connected to the at least one flow equalization tank via piping;
    at least one screen connected to the influent pump and flow equalization tank via piping, wherein the at least one screen filters out additional solids from the liquids to produce clarified liquids;
    an influent composite sampling tap connected to, and downstream from, the at least one screen via piping, wherein the influent composite sampling tap is used to retrieve influent samples for evaluation to monitor the composition of the liquids clarified and filtered by the at least one screen;

at least one membrane bioreactor connected to the at least one screen and sampling tap via piping, wherein the at least one membrane bioreactor filters the clarified liquids;

at least one pump connected to, and downstream from, the at least one membrane bioreactor via piping;

at least one effluent storage tank connected to, and downstream from, the at least one pump via piping;

at least one sonolysis unit connected to, and downstream from, the at least one effluent storage tank via piping; and, at least one thermal evaporator connected to, and downstream from, the at least one sonolysis unit.

12. The wastewater treatment and management system of claim 11 further comprising at least one ultraviolet disinfection unit connected to, and downstream from, the at least one effluent storage tank via piping, and connected to, and upstream from, the at least one sonolysis unit via piping.

13. The wastewater treatment and management system of claim 11 further comprising a condenser connected to, and downstream from, the at least one thermal evaporator to condense water vapor created by the at least one evaporator.

14. The wastewater treatment and management system of claim 13 further comprising a water storage tank connected to, and downstream from, the condenser for receiving water vapor condensed into water by the condenser.

15. The wastewater treatment and management system of claim 11 wherein each of the at least one sonolysis unit comprises a sonolysis tube having an interior, wherein the sonolysis tube is secured in an outer jacket, wherein the at least one sonolysis unit further comprises a plurality of sound transducers are secured in the outer jacket of each of the at least one sonolysis unit.

16. The wastewater treatment and management system of claim 15 wherein each of the at least one sonolysis unit includes at least two valves, an upstream valve positioned upstream of the at least one sonolysis unit and a downstream valve positioned downstream of the at least one sonolysis unit, wherein the upstream and downstream valves are in fluid communication with the interior of the sonolysis tube of each of the at least one sonolysis unit.

17. A wastewater treatment and management system comprising:

at least one pre-treatment tank for receiving raw sewage comprising, grease, grit, primary solids and liquids including water, wherein the at least one pre-treatment tank separates solids from liquids;

at least one flow equalization tank connected via piping to the at least one pre-treatment tank, wherein the flow equalization tank is in fluid communication with the at least one pre-treatment tank;

at least one influent pump connected to the at least one flow equalization tank via piping;

at least one screen connected to the influent pump and flow equalization tank via piping, wherein the at least one screen filters out additional solids from the liquids to produce clarified liquids;

an influent composite sampling tap connected to, and downstream from, the at least one screen via piping, wherein the influent composite sampling tap is used to monitor the composition of the liquids clarified and filtered by the at least one screen;

at least one membrane bioreactor connected to the at least one screen and sampling tap via piping, wherein the at least one membrane bioreactor filters the clarified liquids;

at least one pump connected to, and downstream from, the at least one membrane bioreactor via piping;

at least one effluent storage tank connected to, and downstream from, the at least one pump via piping;

at least one ultraviolet disinfection unit connected to, and downstream from, the at least one pump via piping, wherein the pump urges the fluids processed by the at least one bioreactor into the at least one ultraviolet disinfection unit; and, at least one thermal evaporator connected to, and downstream from, the at least one effluent storage tank.

18. The wastewater treatment and management system of claim 17 further comprising a condenser connected to, and downstream from, the at least one thermal evaporator to condense water vapor created by the at least one evaporator.

19. The wastewater treatment and management system of claim 18 further comprising a water storage tank connected to, and downstream from, the condenser for receiving water vapor condensed into water by the condenser.

20. The wastewater treatment and management system of claim 19 further comprising a water purification unit secured to the water storage tank via piping and selected from the group consisting of an ozonator, a second UV unit, a chlorination unit and combinations thereof.

* * * * *